(12) United States Patent
Kumar et al.

(10) Patent No.: US 9,610,948 B2
(45) Date of Patent: Apr. 4, 2017

(54) MOVEMENT DETECTION SYSTEM AND METHOD

(71) Applicant: General Electric Company, Schenectady, NY (US)

(72) Inventors: Ajith Kuttannair Kumar, Erie, PA (US); Brian Nedward Meyer, Fairview, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/693,075

(22) Filed: Apr. 22, 2015

(65) Prior Publication Data

US 2016/0257309 A1 Sep. 8, 2016

Related U.S. Application Data

(60) Provisional application No. 62/128,290, filed on Mar. 4, 2015.

(51) Int. Cl.
| | |
|---|---|
| *B60W 30/14* | (2006.01) |
| *G05B 13/02* | (2006.01) |
| *B60L 15/20* | (2006.01) |
| *B60W 40/105* | (2012.01) |
| *B61L 3/00* | (2006.01) |

(52) U.S. Cl.
CPC ....... *B60W 30/143* (2013.01); *B60L 15/2045* (2013.01); *B60W 40/105* (2013.01); *B61L 3/006* (2013.01); *G05B 13/021* (2013.01)

(58) Field of Classification Search
CPC ............. B60W 30/143; B60W 40/105; B60W 2250/142; B61L 3/006; B61L 15/2045; B61L 2260/54; B61L 7/10; G05B 13/021; Y02T 10/7283
See application file for complete search history.

(56) References Cited

U.S. PATENT DOCUMENTS

| | | |
|---|---|---|
| 4,132,175 A | 1/1979 | Miller et al. |
| 4,335,432 A | 6/1982 | Pue |
| 4,375,193 A | 3/1983 | Sullivan |

(Continued)

OTHER PUBLICATIONS

Knight, Will; "10-4, Good Computer: Automated System Lets Trucks Convoy as One"; MIT Technology Review, May 28, 2014; http://www.technologyreview.com/news/527476, 3 pgs.

*Primary Examiner* — Abby Lin
(74) *Attorney, Agent, or Firm* — John A. Kramer; Global Patent Operation

(57) ABSTRACT

A system and method for detecting movement of a vehicle and/or for changing operating modes of the vehicle switch between transitional operating mode of the vehicle at a first vehicle speed and a moving mode of the vehicle at a second vehicle speed. Movement of the vehicle is controlled to maintain a speed and/or location of the vehicle within designated limits during operation of the vehicle in the transitional operating mode. Movement of the vehicle is controlled to keep an operating parameter of the vehicle below a designated limit during operation of the vehicle in the moving mode. The vehicle switches between the transitional operating mode and the moving mode based at least in part on the vehicle speed, a distance from the target stopping location, an environmental condition, a vehicle characteristic, and/or a route occupancy condition.

22 Claims, 12 Drawing Sheets

(56) References Cited

U.S. PATENT DOCUMENTS

| | | | |
|---|---|---|---|
| 4,382,412 | A | 5/1983 | Sullivan |
| 4,829,908 | A * | 5/1989 | Hallam .................... B61D 7/28 |
| | | | 105/240 |
| 5,657,696 | A | 8/1997 | Bishop |
| 6,029,104 | A | 2/2000 | Kim |
| 6,237,504 | B1 | 5/2001 | Tanahashi et al. |
| 6,318,274 | B1 | 11/2001 | Park |
| 8,370,006 | B2 | 2/2013 | Kumar et al. |
| 8,463,469 | B2 | 6/2013 | Daum et al. |
| 8,494,695 | B2 | 7/2013 | Cooper et al. |
| 8,591,778 | B2 | 11/2013 | Kang |
| 8,751,073 | B2 | 6/2014 | Kumar et al. |
| 8,768,543 | B2 | 7/2014 | Kumar et al. |
| 2002/0108794 | A1 * | 8/2002 | Wakashiro ................ B60K 6/48 |
| | | | 180/65.25 |
| 2009/0321165 | A1 * | 12/2009 | Haug .................... B60W 20/00 |
| | | | 180/65.275 |
| 2010/0023190 | A1 | 1/2010 | Kumar et al. |
| 2010/0174484 | A1 | 7/2010 | Sivasubramaniam et al. |
| 2010/0217462 | A1 | 8/2010 | Shaffer et al. |
| 2011/0160946 | A1 * | 6/2011 | Wilde .................... B60W 10/06 |
| | | | 701/22 |
| 2013/0299645 | A1 | 11/2013 | Cooper et al. |
| 2014/0042655 | A1 | 2/2014 | Kang |

* cited by examiner

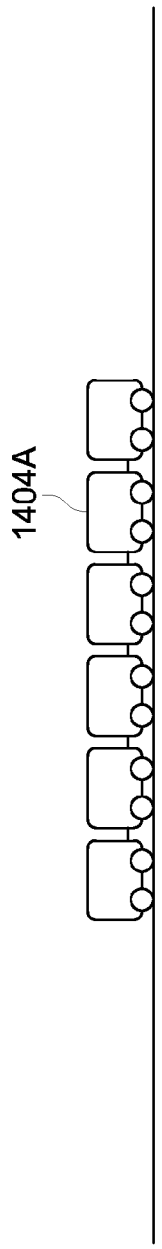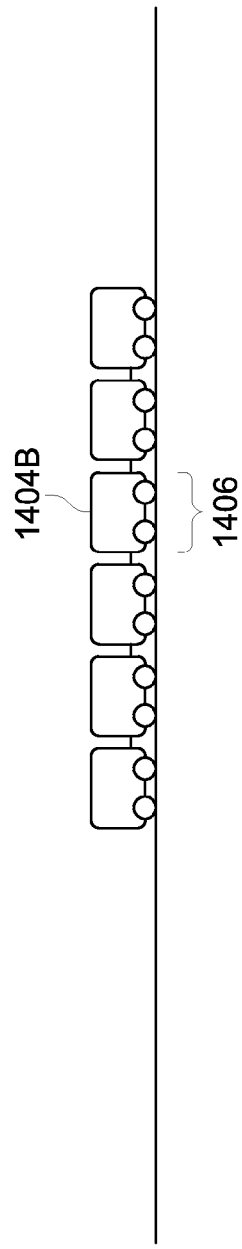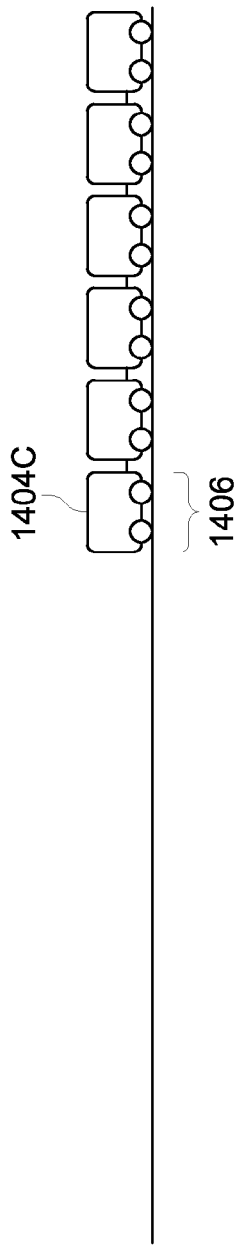

MOVEMENT DETECTION SYSTEM AND METHOD

CROSS-REFERENCE TO RELATED APPLICATIONS

This application claims priority to U.S. Provisional Application No. 62/128,290, which was filed on 4 Mar. 2015, and the entire disclosure of which is incorporated by reference herein.

FIELD

Embodiments of the inventive subject matter described herein relate to systems and methods that detect initiation of movement of vehicles.

BACKGROUND

Vehicles may travel according to trip plans that designate speeds of the vehicles at different locations along a route. The trip plans can be used to autonomously control the vehicles or to provide instructions to an operator of a vehicle in order to instruct or coach the operator on how fast the vehicle should be moving at different locations along the route. For example, TRIP OPTIMIZER by General Electric Company can generate trip plans to dictate how fast trains should move at different locations along a route. The trip plans may be created to reduce fuel consumed and/or emissions generated by the vehicles relative to the vehicles being manually controlled, the vehicles traveling at speed limits of the route, or the like.

One problem that can arise with trip plans is the detection of when a vehicle begins moving. Some vehicles, such as trains, can move for a significant distance before movement is detected. While speed sensors can be used to detect when an axle or wheel of a vehicle is rotating to identify movement of the vehicle, a wheel may be slipping relative to the surface being traveled upon. Rotation of a wheel and/or axle may be incorrectly identified as movement of the vehicle when the rotation is not moving the vehicle forward.

As a result, trip plans may begin and/or end at lower speed limits or speed points. A vehicle is controlled manually until the vehicle is brought up to the initial speed designated by the trip plan and/or the vehicle is controlled manually after the vehicle slows below the lower speed limit. Some vehicles may need to accelerate for significant distances in order to reach the lower speed limit of a trip plan and/or to slow down below the lower speed limit for significant distances in order to stop. For example, long freight trains may need to travel for a significant period of time before reaching the speeds designated by a trip plan and/or to stop after slowing below the lower speed limit of the trip plan. The travel of the vehicles at speeds below the lower speed limits of the trip plans can be less efficient than the travel according to the trip plan. As a result, the vehicles are consuming more fuel and/or generating more emissions than necessary.

Moreover, traveling according to trip plans can provide various benefits, such as fuel economy, as long as the objectives of the trip plan are relevant to the operations of the vehicle system. For example, the objective of increasing fuel efficiency is beneficial to the vehicle system as the vehicle system travels along an open section of the route at a planned running speed, but the same trip plan is not as beneficial if the section of the route has maintenance, congestion, or other constraints that limit the speed of the vehicle system to a speed below the planned running speed. In another example, the objective of increasing fuel economy is also not relevant near the designated stop locations (including the arrival location) along the route because the vehicle system has to travel at slow speeds to stop at the stop locations. Due to these issues, some operators of the vehicle system may choose to not follow the trip plan.

BRIEF DESCRIPTION

In one embodiment, a system (e.g., a movement detection system) includes a controller operable to switch between a transitional operating mode of a vehicle at a first vehicle speed and a moving mode of the vehicle at a second vehicle speed. The controller is configured to control movement of the vehicle to one or more of maintain a speed of the vehicle within a first designated tolerance range and/or maintain a location of the vehicle within a second designated tolerance range relative to a target stopping location during operation of the vehicle in the transitional operating mode. The controller also is configured to control the movement of the vehicle to control an engine of the vehicle to keep an operating parameter of the vehicle below a designated limit during operation of the vehicle in the moving mode. The controller is configured to switch the vehicle between the transitional operating mode and the moving mode based at least in part on one or more of the speed of the vehicle relative to a threshold speed value, a distance of the vehicle from the target stopping location, an environmental condition, a vehicle characteristic, and/or a route occupancy condition.

In another embodiment, a method (e.g., for detecting movement of a vehicle and/or for changing operating modes of the vehicle) includes switching between a transitional operating mode of a vehicle at a first vehicle speed and a moving mode of the vehicle at a second vehicle speed, controlling movement of the vehicle to one or more of maintain a speed of the vehicle within a first designated tolerance range and/or maintain a location of the vehicle within a second designated tolerance range relative to a target stopping location during operation of the vehicle in the transitional operating mode, and controlling the movement of the vehicle to control an engine of the vehicle to keep an operating parameter of the vehicle below a designated limit during operation of the vehicle in the moving mode. Switching the vehicle between the transitional operating mode and the moving mode occurs based at least in part on one or more of the speed of the vehicle relative to a threshold speed value, a distance of the vehicle from the target stopping location, an environmental condition, a vehicle characteristic, and/or a route occupancy condition.

In another embodiment, a method (e.g., for detecting movement of a vehicle and/or for changing operating modes of the vehicle) includes implementing control of a vehicle, responsive to initiation of movement of the vehicle, according to a transitional operating mode of a vehicle. The vehicle is controlled to one or more of maintain a speed of the vehicle within a first designated tolerance range and/or maintain a location of the vehicle within a second designated tolerance range relative to a target stopping location during operation of the vehicle in the transitional operating mode. The method also includes switching the vehicle from the transitional operating mode to a moving mode responsive to the speed of the vehicle increasing above a designated threshold speed. The vehicle is controlled to control an engine of the vehicle to keep an operating parameter of the vehicle below a designated limit during operation of the vehicle in the moving mode. Switching the vehicle between the transitional operating mode and the moving mode occurs based at least in part on one or more of the speed of the vehicle relative to a threshold speed value, a distance of the vehicle from the target stopping location, an environmental condition, a vehicle characteristic, and/or a route occupancy condition.

BRIEF DESCRIPTION OF THE DRAWINGS

Reference is made to the accompanying drawings in which particular embodiments and further benefits of the inventive subject matter are illustrated as described in more detail in the description below, in which:

FIG. 17 illustrates the vehicle shown in FIG. 14 being indexed through different locations according to one embodiment;

FIG. 18 illustrates the vehicle shown in FIG. 14 being indexed through different locations according to one embodiment; and FIG. 19 illustrates the vehicle shown in FIG. 14 being indexed through different locations according to one embodiment.

DETAILED DESCRIPTION

One or more embodiments of the inventive subject matter described herein provide systems and methods for detecting when a vehicle begins and/or stops moving. The systems and methods may be used to more accurately identify the initiation of movement of various types of vehicles, which can be used to determine when to initiate implementation of a trip plan. Optionally, the systems and methods can more accurately determine when a vehicle stops moving, which can assist passengers in vehicles that are automatically controlled in safely exiting the vehicles.

Figure 1:
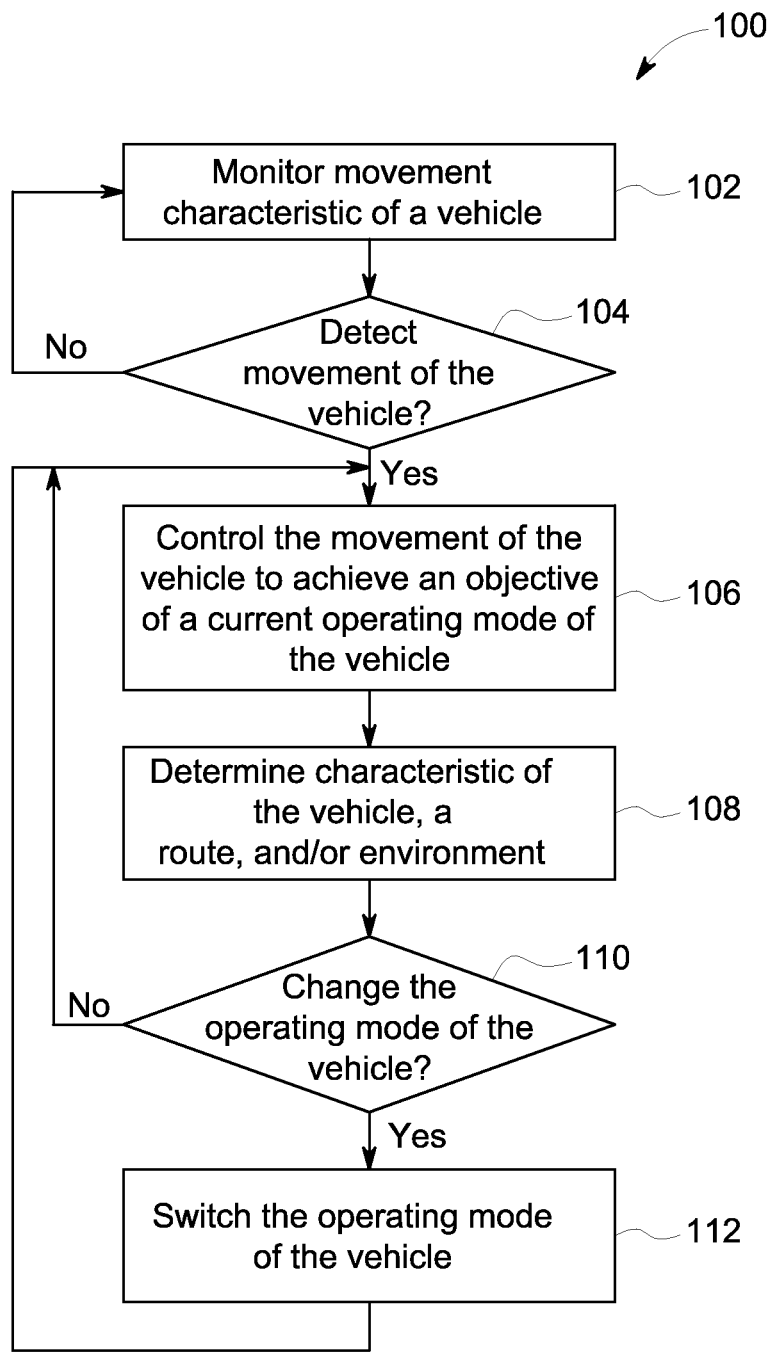
FIG. 1 illustrates a flowchart of one embodiment of a method for detecting movement of a vehicle and/or for changing operating modes of the vehicle.
Figure 2:
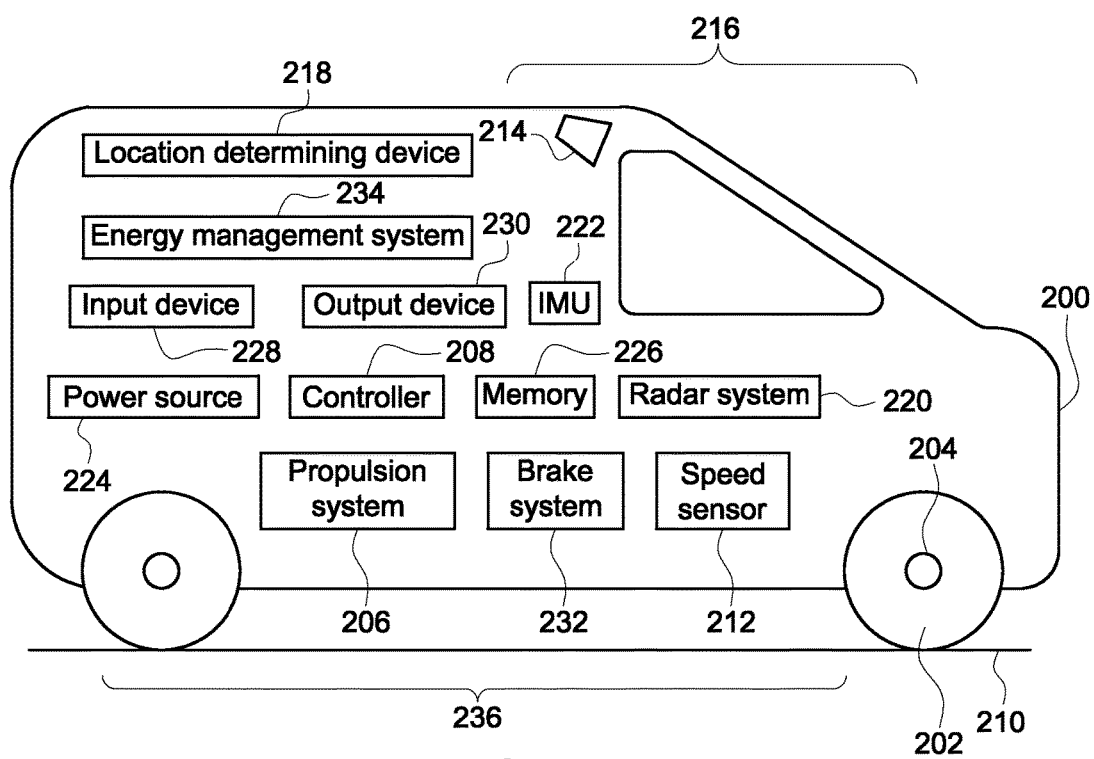
FIG. 2 illustrates a schematic diagram of a vehicle according to one embodiment.

FIG. 1 illustrates a flowchart of one embodiment of a method 100 for detecting movement of a vehicle and/or for changing operating modes of the vehicle. The method 100 may be practiced with one or more embodiments of vehicles, movement detection systems, and vehicle controllers described herein. For example, the method 100 may be performed using a movement detection system 236 (shown in FIG. 2) that includes one or more of a controller 208, a speed sensor 212, a radar system 220, an inertial measurement unit (IMU) 222, a camera 214, a location determining device 218, a memory 226, and/or a propulsion system 206 of a vehicle 200, as shown in FIG. 2 and described herein. At 102, one or more movement characteristics of a vehicle are monitored. The movement characteristics can include any of a number of different features or qualities of the vehicle that are indicative of movement of the vehicle. The characteristics may change when the vehicle changes from a stationary state to a moving state, and/or when the vehicle changes from a moving state to a stationary state. The characteristics described herein optionally may be referred to as operating conditions.

With continued reference to the flowchart of the method 100 shown in FIG. 1, FIG. 2 illustrates a schematic diagram of the vehicle 200 according to one embodiment. The vehicle 200 is shown as a single vehicle unit (such as a single automobile, rail vehicle, other off-highway vehicle, marine vessel, airplane, or the like), but optionally may include two or more vehicle units (such as a rail vehicle consist, train, convoy of multiple automobiles, etc.).

The vehicle 200 can include two or more wheels 202 connected with axles 204. The axles 204 and wheels 202 may be rotated by the propulsion system 206. The propulsion system 206 can represent one or more engines, power sources (e.g., generators, alternators, batteries, capacitors, flywheels, etc.), motors, or the like, that generate torque to rotate the axles 204 and/or wheels 202. The propulsion system 206 can include gears, gear boxes, shafts, or the like, that connect and translate work performed by the propulsion system 206 into rotation of the axles 204 and/or wheels 202. Optionally, a power source 224 for providing power to one or more motors of the propulsion system 206 may be provided outside of (e.g., not included in) the propulsion system 206. The power source 224 can represent one or more batteries, generators, alternators, capacitors, or the like. In one embodiment, the power source 224 may power one or more other components of the vehicle 200.

In one embodiment, the propulsion system 206 can independently control the amount of torque applied to different axles 204 and/or wheels 202. For example, the controller 208 can generate signals that cause the propulsion system 206 to generate and apply more torque to one axle 204 than another axle 204 at the same time. The propulsion system 206 may include motors connected to different axles 204 in order to apply the different torques to the axles 204. The controller 208 can represent hardware circuitry that includes and/or is connected with one or more processors, microcontrollers, or other electronic logic-based devices.

As described above in connection with the method 100, at 102, a movement characteristic of the vehicle 200 is monitored. This movement characteristic can include rotational displacement of one or more components of the vehicle, such as the distance that a wheel 202 and/or axle 204. The controller 208 can determine whether and/or how far one or more wheels 202 rotate to determine whether the vehicle 200 is moving (as described below). In one embodiment, the speed sensor 212 can output a displacement signal representative of how far a wheel 202 and/or axle 204 has rotated. The speed sensor 212 can include a tachometer that generates signals representative of how far the wheel 202 or axle 204 has rotated.

Additionally or alternatively, at 102, the movement characteristic of the vehicle 200 that can be monitored can include optical characteristics of images and/or video. The vehicle 200 can include the camera 214 located onboard the vehicle 200. The camera 214 can obtain images and/or video during operation of the vehicle 200. As described below, these images and/or video can be monitored for changes to determine if the vehicle 200 has begun moving from a stationary state.

In one embodiment, the camera 214 may be located inside the vehicle 200 such that a field of view (e.g., the areas that are shown in images and/or videos generated by the camera 214) of the camera 214 includes part of the inside of the vehicle 200. For example, the camera 214 may be located in and/or may have a field of view that includes at least part of an operator cab 216 of the vehicle 200. The operator cab 216 represents a space inside the vehicle 200 where an operator is located to control operations of the vehicle 200. The field of view of the camera 214 may include a window or other light transmissive portion of the vehicle 200 such that the field of view also includes one or more areas outside of the vehicle 200. Optionally, the camera 214 may be located on an exterior surface of the vehicle 200.

Additionally or alternatively, at 102, the movement characteristic of the vehicle 200 that is monitored can include vehicle displacement. The vehicle displacement represents how far the vehicle 200 has moved. In one aspect, the vehicle displacement may be unidirectional vehicle displacement, such as the distance that the vehicle 200 has moved in a single direction (e.g., and not in any other directions). For example, only displacement along a single direction may be monitored, such as the direction along which the route 210 extends.

The vehicle 200 can include the location determining device 218 that generates location data representative of where the vehicle 200 is located, speed of the vehicle 200, heading of the vehicle 200, or the like. In one aspect, the location determining device 218 can represent a global positioning system receiver. Alternatively, the location determining device 218 can include another device, such as a wireless transceiver that communicates with cellular towers. The location determining device 218 can determine a location of where the vehicle 200 is located based on wireless signals received from sources outside of the vehicle 200 (e.g., global positioning system satellites, cellular towers, or the like). The location determining device 218 may generate location data representative of this location and communication the location data with the controller 208. This location data can include geographic coordinates of the location determining device 218 or other information representative of where the vehicle 200 is located.

The controller 208 may receive different location data from the location determining device 218 at different times. The location data may change over time due to movement of the vehicle 200, but also potentially due to drift in signals received by and/or generated by the location determining device 218, due to tolerances of the location determining device 218 in determining the coordinates, due to external interference, or the like. The controller 208 may examine only the location data representative of movement along a single direction in one embodiment. For example, the controller 208 may examine changes in the location data along a first direction (e.g., a direction that is parallel to a latitude of the earth, a direction that is parallel to a longitude of the earth, a direction that is obliquely oriented with respect to a latitude and/or longitude of the earth, a direction that extends along a segment of the route 210, or the like). This direction may be referred to as a movement direction of interest. The controller 208 may ignore changes in the location data representative of movement along any other direction. Optionally, the location determining device 218 may communicate the location data or changes in the location data along the movement direction of interest to the controller 208, and not communicate location data or changes in the location data along other directions.

Additionally or alternatively, at 102, the movement characteristic of the vehicle 200 that is monitored can include a separation distance and/or a time of flight. The separation distance can be a distance between the vehicle 200 and one or more objects located outside of the vehicle 200. The time of flight can be a time period during which one or more electromagnetic waves are emitted toward the one or more objects located outside of the vehicle 200 and reflected or backscattered echoes of the waves are received back at the vehicle 200. In one embodiment, the vehicle 200 can include the radar system 220 that transmits electromagnetic waves outside of the vehicle 200 (e.g., toward the ground, toward the route 218, toward objects disposed along the route 218, or the like).

The radar system 220 can measure a time of flight as the time between emitting one or more electromagnetic waves and the time at which the one or more electromagnetic waves are received back at the radar system 220. The radar system 220 can include one or more antennas and associated hardware circuitry that transmits and receives the waves. The hardware circuitry of the radar system 220 optionally may include and/or be connected with one or more processors, microcontrollers, or other electronic logic-based devices. The radar system 220 can communicate the time of flight information to the controller 208 and/or may convert the time of flight information into a separation distance between the radar system 220 and the object off which the waves were at least partially reflected. This separation distance can be communicated to the controller 208. Optionally, the controller 208 can determine the separation distance based on the time of flight that is reported to the controller 208 from the radar system 220.

Additionally or alternatively, at 102, the movement characteristic of the vehicle 200 that is monitored can include inertia of the vehicle 200. The vehicle 200 can include one or more IMUs 222 or other devices that measure inertia of the vehicle 200 and/or changes in the inertia of the vehicle 200. The IMU 222 may generate inertial data that represents one or more of an orientation of the vehicle 200, a velocity of the vehicle 200, and/or a gravitational force. This inertial data may be communicated to the controller 208 as the movement characteristic. Optionally, the IMU 222 shown in FIG. 2 may represent one or more accelerometers and/or gyroscopes that are not an IMU.

Returning to the description of the flowchart of the method 100 shown in FIG. 1, at 104, the movement characteristic or characteristics that are monitored are examined in order to determine if movement of the vehicle 200 is detected. If the movement characteristic or characteristics indicate that movement of the vehicle 200 has begun (e.g., the vehicle 200 has started moving from a stationary state or position), then movement of the vehicle 200 is detected. As a result, flow of the method 100 can advance toward 106. On the other hand, if the movement characteristic or characteristics do not indicate that movement of the vehicle 200 has begun (e.g., the vehicle 200 remains stationary), then no movement of the vehicle 200 is detected. As a result, flow of the method 100 can return toward 102 for monitoring of the same or different movement characteristics.

In one aspect, rotational displacement of one or more components of the vehicle 200 may be examined in order to determine if the vehicle 200 has begun moving from a stationary state. The controller 208 can examine the rotational displacement measured by the speed sensor 212 for one or more wheels 202 and/or axles 204 of the vehicle 200.

Merely measuring rotational displacement of a wheel 202 and/or axle 204, however, may not accurately determine whether the vehicle 200 has initiated movement. For example, if adhesion between the wheel 202 and a surface of a route 210 being traveled upon by the vehicle 200 is poor, then the wheel 202 may slip relative to the surface of the route 210. This slipping can cause the wheel 202 to rotate without the vehicle 200 actually moving along the route 210.

In order to prevent the slipping of a wheel 202 from being incorrectly identified as initiation of movement of the vehicle 200, at 102, the movement characteristic of rotational displacement of a wheel 202 and/or axle 204 can be examined by reducing the torque or tractive effort applied to a first axle 204 or a first wheel 202 relative to one or more, or all, other axles 204 and/or wheels 202 of the same vehicle 200 or vehicle unit (where the vehicle 200 includes two or more vehicle units). This first axle 204 or first wheel 202 may be referred to as a de-rated axle 204 or de-rated wheel 202. The torque or tractive effort may be reduced below a lower threshold that is associated with wheels 202 not slipping on the route 210. The lower threshold may be determined from previous observations of the vehicle 200, such as by examining the wheels 202 at different torques or tractive efforts to determine which torques or tractive efforts cause slipping of the wheels 202.

The controller 208 can then determine the rotational displacement of the de-rated wheel 202 or axle 204 based on a signal output by the speed sensor 212. If the controller 208 receives signals from the same or other speed sensors 212 for other wheels 202 or axles 204, the controller 208 can disregard or not use those signals to monitor the movement characteristic (e.g., rotational displacement) of the vehicle 200. The torque or tractive effort applied to the de-rated axle 204 or wheel 202 may then be increased for movement of the vehicle 200. In one embodiment, the controller 208 may repeatedly determine the rotational displacement of the de-rated wheel 202 and/or de-rated axle 204. The controller 208 can monitor the same wheel 202 or axle 204 as the de-rated wheel 202 or axle 204, or may use different wheels 202 or axles 204 at different times as the de-rated wheel 202 or axle 204.

If the de-rated wheel 202 and/or axle 204 has rotated (e.g., due to the commencement of movement of the vehicle 200), then the rotational displacement (e.g., a distance measurement) received from the speed sensor 212 will change. If the de-rated wheel 202 and/or axle 204 has not rotated (e.g., due to the vehicle 200 remaining stationary), then the rotational displacement received from the speed sensor 212 will not change or will change by a small amount (e.g., less than a designated threshold representative of noise in the system or speed sensor 212).

In one embodiment, the rotational displacement of two or more different axles 204 and/or wheels 202 of the same vehicle 200 (or same vehicle unit where the vehicle 200 includes two or more vehicle units) may be compared to determine if the vehicle 200 has begun moving from a stationary position. For example, the rotational displacement of the de-rated axle 204 or wheel 202 may be compared with the rotational displacement of one or more axles 204 and/or wheels 202 that were not de-rated. If the rotational displacement of the axles 204 and/or wheels 202 that were not de-rated is larger than the rotational displacement of the de-rated axle 204 and/or wheel, then the larger rotational displacement may indicate that the axles 204 and/or wheels 202 that were not de-rated is due to slipping of the wheels 202 on the route 210 while the smaller rotational displacement of the de-rated axle 204 and/or wheel 202 may indicate that the vehicle 200 has not yet begun to move (e.g., if this rotational displacement is small, such as less than a threshold distance of three centimeters, six centimeters, ten centimeters, fifty centimeters, or another value). In one embodiment, the threshold distance may be a non-zero distance and non-negative distance. Alternatively, the threshold distance has a value of zero. But, if the rotational displacement of the de-rated axle 204 and/or wheel 202 is greater than this threshold distance, then the rotational displacement may indicate that movement of the vehicle 200 has begun.

Figure 6:
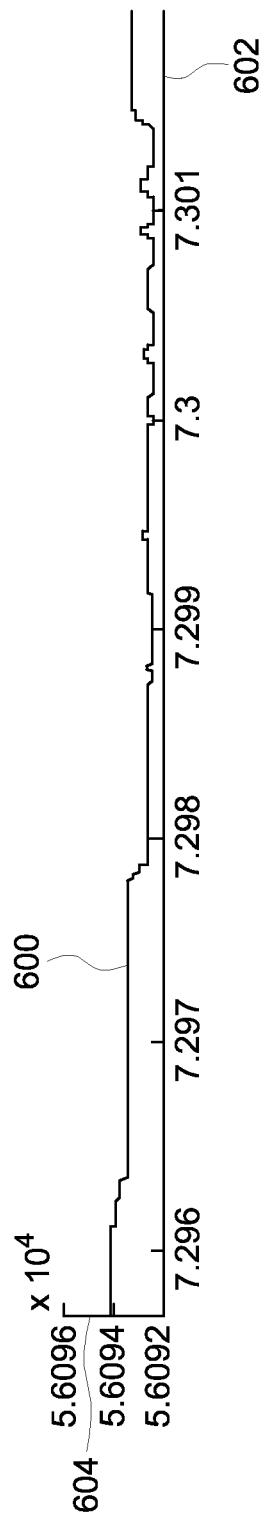
FIG. 6 illustrates rotational displacement data for a de-rated axle or wheel of the vehicle shown in FIG. 2 according to one example.
Figure 7:
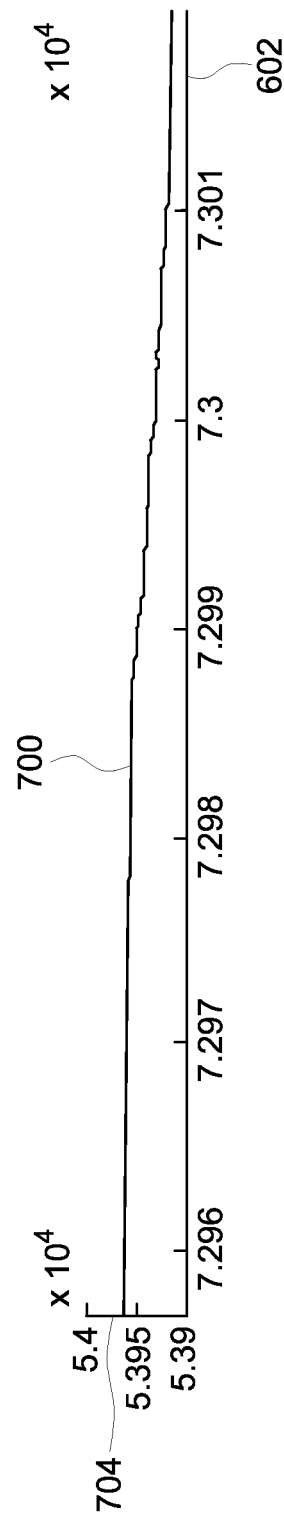
FIG. 7 illustrates rotational displacement data for another axle or wheel of the vehicle shown in FIG. 2 that is not de-rated according to one example.

FIG. 6 illustrates rotational displacement data 600 for a de-rated axle 204 or wheel 202 of the vehicle 200 according to one example. FIG. 7 illustrates rotational displacement data 700 for another axle 204 or wheel 202 of the vehicle 200 that is not de-rated according to one example. The rotational displacement data 600, 700 are shown alongside a horizontal axis 602 representative of time and vertical axes 604, 704 representative of rotational displacements. The vertical axis 704 extends over a larger range of rotational displacements than the vertical axis 604 because the rotational displacement data 700 indicates greater rotational movement of the axle 204 that was not de-rated.

As shown by a comparison of the rotational displacement data 600, 700, the axle 204 or wheel 202 that was not de-rated rotated by approximately fifty inches (e.g., 127 centimeters) while the de-rated axle 204 or wheel 202 rotated by approximately one inch (e.g., 2.5 centimeters). The controller 208 can examine this data 600, 700 and determine that the vehicle 200 has not yet started to move because the data 600 indicates that the de-rated axle 204 or wheel 202 has rotated by less than the threshold distance while the data 700 indicates that the other axle 204 or wheel 202 has rotated by much more than the threshold distance.

Figure 8:
FIG. 8 illustrates rotational displacement data for a de-rated axle or wheel of the vehicle shown in FIG. 2 according to another example.
Figure 9:
FIG. 9 illustrates rotational displacement data for another axle or wheel of the vehicle shown in FIG. 2 that is not de-rated according to one example.

FIG. 8 illustrates rotational displacement data 800 for a de-rated axle 204 or wheel 202 of the vehicle 200 according to another example. FIG. 9 illustrates rotational displacement data 900 for another axle 204 or wheel 202 of the vehicle 200 that is not de-rated according to one example. The rotational displacement data 800, 900 are shown alongside a horizontal axis 802 representative of time and vertical axes 804, 904 representative of rotational displacements.

As shown by a comparison of the rotational displacement data 800, 900, the axle 204 or wheel 202 that was not de-rated rotated by the same or approximately same distance as the de-rated axle 205 or wheel 202. The controller 208 can examine this data 800, 900 and determine that the vehicle 200 has started to move because the data 800 indicates that both the de-rated axle 204 or wheel 202 is rotating and the other axle 204 or wheel 202 that is not de-rated also is rotating.

Optionally, in addition to or as an alternate to de-rating an axle 204 and/or wheel 202 to measure the rotational displacement, a throttle of the vehicle 200 may be limited. The throttle may be included in or represented by the input device 228 shown in FIG. 2. Limiting a throttle can include preventing an operator or autonomous control of the throttle from increasing the throttle above a designated reduced throttle limit. The reduced throttle limit can be an upper limit on the throttle that is smaller than an upper or maximum range of the throttle. For example, prior to limiting the throttle of the vehicle 200, the throttle may have a range of positions or settings from one to eight (representing different tractive efforts, torques, speeds, or the like). Optionally, the throttle may include a pedal that has a range of movement. The throttle can be limited by preventing the throttle from being moved above a reduced position, such as the setting of four. Optionally, the throttle can be limited by preventing the throttle from being moved along the full or entire range of movement. During reduction of the throttle, the rotational displacement can be measured. Reducing the throttle can prevent slipping of the wheels 202 on the route 210 and thereby provide a more accurate indication of whether or not the vehicle 200 has begun moving.

In another example, optical characteristics of one or more images and/or videos generated by the camera 214 may be examined in order to detect movement of the vehicle 200. The optical characteristics can include intensities, brightness, color, or the like, of one or more areas of the images and/or videos, changes between different images obtained at different times, changes between different frames of a video, or the like. For example, common (e.g., the same) pixels or other portions of images or videos can be compared between images obtained at different times or frames of the video representative of different times. One or more optical characteristics (e.g., intensity, brightness, color, or the like) of these common pixels or areas can be compared to each other to determine if the optical characteristic or characteristic has changed. Optionally, the size, location, or the like (e.g., optical characteristics), of an object shown in one image or frame of a video may be compared to the size, location, or the like, of the same object in another image or other frame of the video (where the images and/or frames represent different points in time). Depending on whether the size, location, or the like, has changed, movement may or may not be detected.

Figure 3:
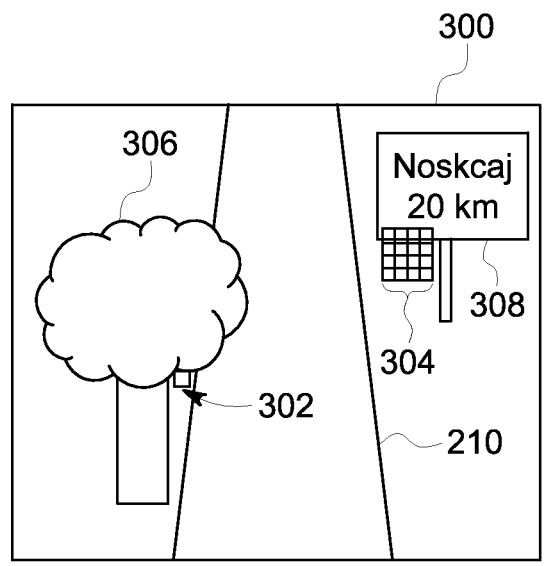
FIG. 3 illustrates an example of image data generated by a camera shown in FIG. 2.
Figure 4:
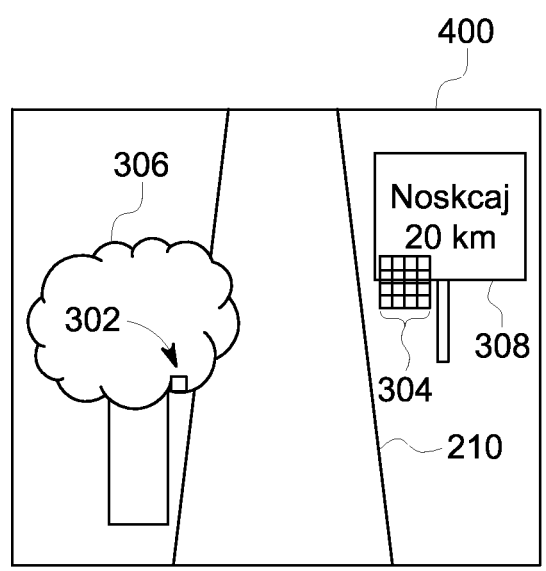
FIG. 4 illustrates another example of image data generated by a camera shown in FIG. 2.
Figure 5:
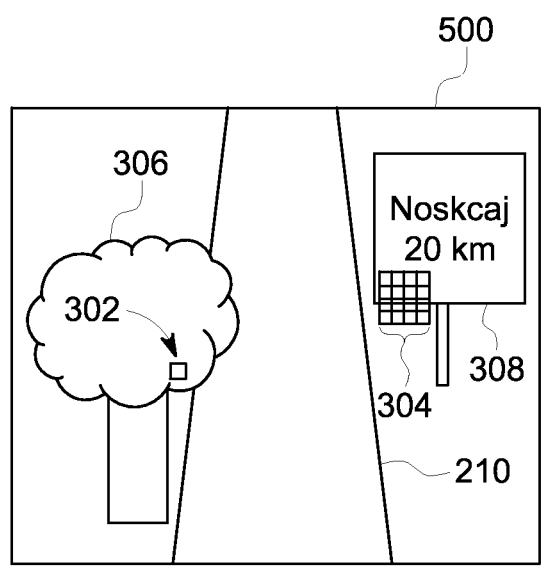
FIG. 5 illustrates another example of image data generated by a camera shown in FIG. 2.

FIGS. 3 through 5 illustrate examples of image data 300, 400, 500 generated by the camera 214. The image data 300 may represent a static image or a first frame of a video representative of a first time, the image data 400 may represent a static image or second frame of the video representative of a later second time, and the image data 500 may represent a static image or third frame of the video representative of a later third time. In one aspect, the controller 208 (shown in FIG. 2) may examine an optical characteristic of a pixel 302 or a group 304 of pixels in the image data 300, 400, 500 in order to determine if the vehicle 200 (shown in FIG. 2) has begun moving from a stationary position. The image data 300, 400, 500 may be obtained at times that are close to each other, such as within one second, within three seconds, or the like. Alternatively, the image data 300, 400, 500 may be obtained over a longer period of time.

In the illustrated examples, the image data 300, 400, 500 include a representation of a tree 306 and the image data 400, 500 include a representation of a sign 308. Alternatively, one or more other objects that are not part of or connected with the vehicle 200 may be shown in the image data. The controller 208 can examine changes in one or more optical characteristics of the pixel 302 and/or the group 304 of pixels in the different image data 300, 400, 500 to determine if the optical characteristic or characteristics change. A change in the optical characteristic or characteristics can indicate that the vehicle 200 has begun moving relative to the objects (e.g., the tree 304 and/or sign 306) shown in the image data 300, 400, 500.

For example, with respect to the pixel 302, the pixel 302 may represent the ground near the tree 302 in the image data 300, but may represent the leaves of the tree 302 in the image data 400, 500. The pixel 302 may change brightness, intensity, color, or the like, from the image data 300 to another color in the image data 400, 500 as a result. This change can be detected by the controller 208 and may indicate that the vehicle 200 has begun moving. As another example, with respect to the group 304 of pixels, the pixels in the group 304 may represent part of the ground and part of the sign 308 in the image data 300, more of the sign 308 and less of the ground in the image data 400, and even more of the sign 308 and even less of the ground in the image data 500. The brightness, intensity, color, or the like, of the pixels in the group 304 (e.g., the average, median, or the like, of the brightness, intensity, or color) may change due to the group 304 of pixels representing different portions of the ground and sign 308. This change can be detected by the controller 208 and may indicate that the vehicle 200 has begun moving.

In one aspect, the controller 208 can determine a vehicle speed as the characteristic based on examination of the image data. The controller 208 may identify changes in the image data between different images, different frames of a video, or the like. These changes can indicate how fast the vehicle 200 is moving. For example, movement of the tree 306, the sign 308, or another object in the image data by different amounts in different images and/or video frames can indicate how fast the vehicle 200 is moving. Based on how far the object moves in the image data obtained at different times and how far apart in time the image data was obtained, the speed at which the vehicle 200 is moving may be determined (e.g., estimated or calculated). For example, if the same object is in different locations separated by one hundred pixels in video frames temporally separated from each other by five seconds, then the controller 208 can estimate that the vehicle 200 is moving at approximately ten kilometers per hour. If the same object is in different locations separated by two hundred pixels in video frames temporally separated from each other by five seconds, then the controller 208 can estimate that the vehicle 200 is moving at approximately twenty kilometers per hour.

In another example, vehicle displacement may be examined in order to detect movement of the vehicle 200. The controller 208 may examine the distance that the vehicle 200 has moved in a single direction based on the data provided by the location determining device 218, while ignoring or otherwise disregarding the distance that the vehicle 200 has moved in other directions. In one aspect, the controller 208 may determine a direction that the segment of the route 210 that the vehicle 200 is currently on is oriented, and examine displacement of the vehicle 200 only along this direction. The controller 208 can determine this direction from a map, database, or other memory structure that stores directions of different route segments along with were the route segments are located. As shown in FIG. 2, the memory 226 of the movement detection system 236 can store the directions of the route segments along with geographic or other locations of the route segments. The controller 208 can determine where the vehicle 200 is located from the location determining device 218 (and/or based on input provided from an operator of the vehicle 200, such as through an input device 228 of the vehicle 200) and refer to the memory 226 to determine which route segment the vehicle 200 is located upon based on the location of the vehicle 200, as well as the direction along which the route segment extends.

The controller 208 can then examine the location data, or changes in the location data, along this direction. Alternatively, the controller 208 can examine the location data or changes in the location data, along a direction such as a latitudinal direction, a longitudinal direction, or another direction.

Figure 10:
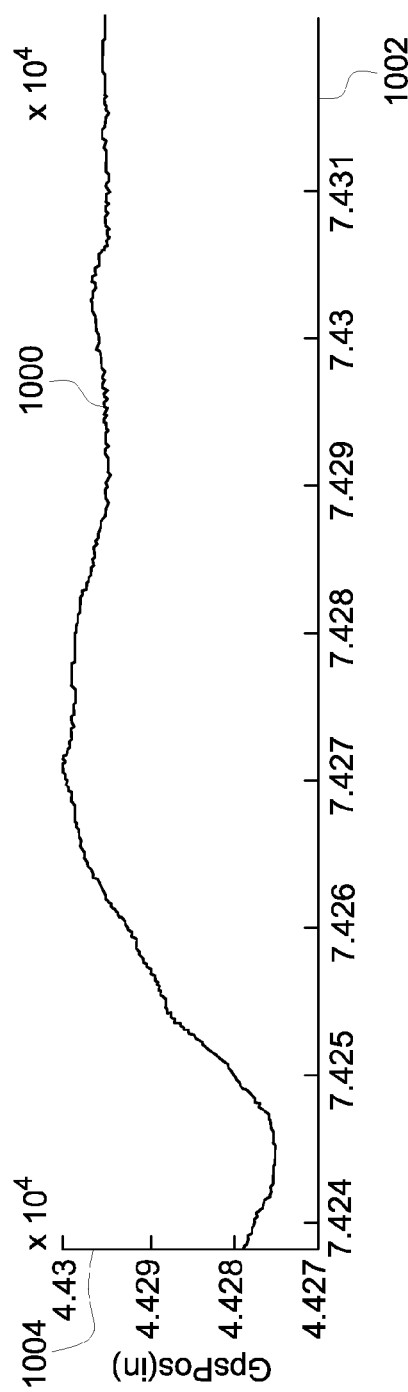
FIG. 10 illustrates location data of the vehicle shown in FIG. 2 according to one example.
Figure 11:
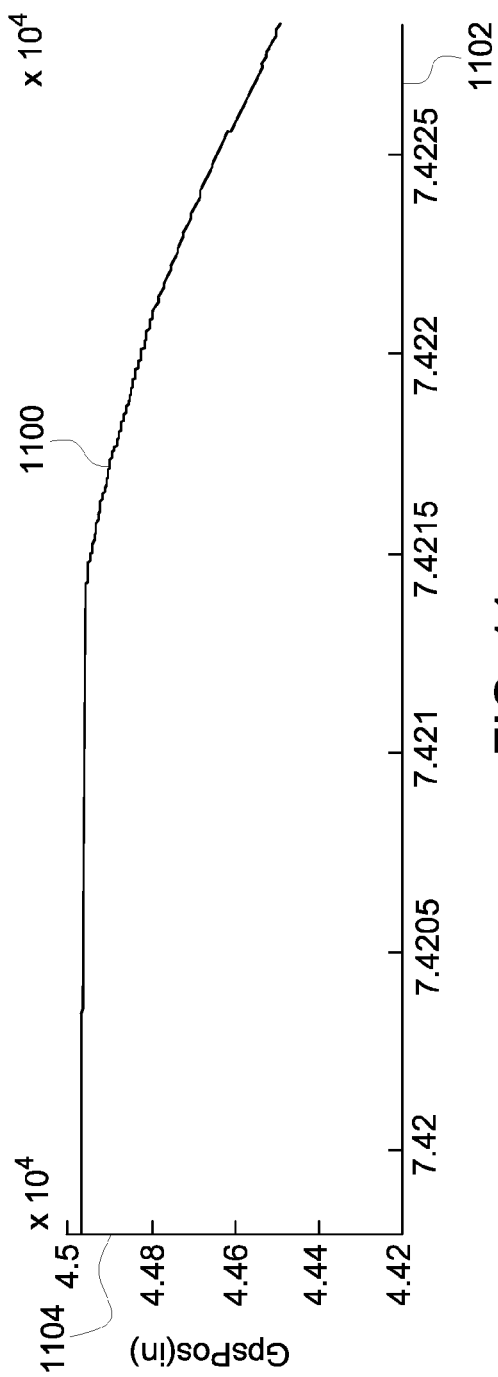
FIG. 11 illustrates location data of the vehicle shown in FIG. 2 according to one example.

FIG. 10 illustrates location data 1000 of the vehicle 200 according to one example. FIG. 11 illustrates location data 1100 of the vehicle 200 according to one example. The location data 1000, 1100 may be unidirectional location data, such as location data representative of where the vehicle 200 is located in a single direction. The location data 1000, 1100 are shown alongside horizontal axes 1002, 1102 representative of time and vertical axes 1004, 1104 representative of distance along the single direction.

In one aspect, the controller 208 can examine the location data 1000 and determine that the vehicle 200 has not begun moving from a stationary position. The location data 1000 extends over a distance of approximately thirty inches (e.g., 76 centimeters), which represents that the location data 1000 indicates that the location determining device 218 has moved approximately thirty inches (e.g., 76 centimeters). The controller 208 can compare this distance to a threshold distance, such as forty inches, fifty inches, 100 inches, or the like (e.g., 102 centimeters, 127 centimeters, 254 centimeters, or the like), or another distance, to determine if the location data 1000 indicates that the vehicle 200 has begun moving. The threshold distance can filter out drift, noise, or the like, from the location data 1000 from the location determining device 218. In the illustrated example, the controller 208 can determine that the displacement along the single direction that is represented by the location data 1000 does not indicate that the vehicle 200 has begun moving.

In contrast, the controller 208 can examine the location data 1100 and determine that the vehicle 200 has begun moving from a stationary position. The location data 1100 extends over a distance of approximately eight hundred inches (e.g., 20 meters), which represents that the location data 1100 indicates that the location determining device 218 has moved approximately eight hundred inches (e.g., 20 meters). The controller 208 can compare this distance to the threshold distance and determine that the location data 1100 indicates that the vehicle 200 has begun moving.

In another example, separation distances and/or times of flight of electromagnetic waves from the radar system 220 can be examined in order to detect movement of the vehicle 200. The controller 208 may examine the separation distances, times of flight, changes in the separation distances, and/or changes in the times of flight to determine if the vehicle 200 has begun moving. For example, if the separation distances, times of flight, changes in the separation distances, and/or changes in the times of flight remain approximately constant (e.g., by not changing by more than a threshold amount, such as 1%, 3%, 5%, 10%, or the like), then the controller 208 can determine that the vehicle 200 has not begun moving relative to one or more objects outside of the vehicle 200. If the separation distances, times of flight, changes in the separation distances, and/or changes in the times of flight do not remain approximately constant (e.g., by changing more than the threshold amount), then the controller 208 can determine that the vehicle 200 has begun moving relative to one or more objects outside of the vehicle 200.

In another example, the controller 208 can examine inertial changes of the vehicle 200 to determine if the vehicle 200 has begun moving. The controller 208 can determine a direction along which the segment of the route 210 beneath the vehicle 200 is located extends, such as by using the location data from the location determining device 218 and the information stored in the memory 226 (as described above), based on input from the operator of the vehicle 200, or the like. The controller 208 can determine if the inertial data or changes in the inertial data indicate movement of the vehicle 200 along this same direction.

For example, the controller 208 may determine that the route 210 extends along a direction oriented at eight degrees (e.g., eight degrees north of the eastern direction). The controller 208 can receive inertial data from the IMU 222 that indicates movement of the vehicle 200 at less than one kilometer per hour along this direction. This data may indicate other movement of the vehicle 200 in one or more other directions, but this other data may be disregarded by the controller 208. The controller 208 can compare the movement of the vehicle 200 along the direction of the route 210 (as indicated by the inertial data from the IMU 222) and compare this movement to one or more speed thresholds (e.g., two kilometers per hour, five kilometers per hour, ten kilometers per hour, or the like). If the movement from the inertial data does not exceed this threshold, then the controller 208 may determine that the vehicle 200 is not yet moving. But, if the movement from the inertial data does exceed the threshold, then the controller 208 can determine that the vehicle 200 has begun moving. Alternatively, the controller 208 may examine inertial data representative of movement along two or more directions to determine if the vehicle 200 has begun moving.

With respect to a multi-vehicle unit embodiment of the vehicle 200 (e.g., the vehicle 1400 having multiple vehicle units 1402, 1404 shown and described in connection with FIG. 14), another technique to identify initiation of movement of the vehicle can include de-rating one or more, or all, of the wheels 202 and/or axles 204 of a selected propulsion-generating vehicle unit of the vehicle and then monitoring rotational displacement of one or more of the de-rated wheels 202 and/or axles 204. The remaining propulsion-generating vehicles may not be de-rated or may not include any wheels 202 or axles 204 that are de-rated. The rotational displacement of the de-rated wheels 202 and/or axles 204 of the selected propulsion-generating vehicle unit may be examined similar to as described above in order to determine when movement of the vehicle begins. In one aspect, the vehicle may operate in a distributed power (DP) arrangement where one propulsion-generating vehicle unit remotely controls the operations of the other propulsion-generating vehicle units. This vehicle unit may be referred to as a lead unit of the vehicle. In one embodiment, the selected propulsion-generating vehicle having the wheels 202 and/or axles 204 that are de-rated is the lead vehicle unit. Alternatively, another vehicle unit may be the selected vehicle unit.

Another technique to identify initiation of movement of such a multi-vehicle unit version of the vehicle can include monitoring movement data of at least two of the vehicle units. The movement data can include information representative of a direction and/or speed of movement. For example, movement data can include rotational displacement of one or more wheels 202 and/or axles 204, acceleration, deceleration, changes in optical characteristics in image data, speeds, or the like. The movement data can be monitored for multiple vehicle units to determine if the vehicle has begun moving from a stationary position. For example, if the movement data is monitored for two (or more) vehicle units and the movement data for one (but not all) of the vehicle units indicates movement, then the controller 208 can determine that the vehicle has not yet begun moving. If the movement data for at least a threshold number of the vehicle units (e.g., at least two of the monitored vehicle units, all of the monitored vehicle units, etc.) indicates movement, then the controller 208 determines that the vehicle has begun moving.

Returning to the description of the flowchart of the method 100 shown in FIG. 1, if it is determined that the vehicle 200 has not yet begun moving, then flow of the method 100 can return toward 102. On the other hand, if it is determined that the vehicle 200 has begun moving, then flow of the method 100 can advance toward 106.

At 106, movement of the vehicle 200 is controlled to achieve an objective of a current operating mode of the vehicle 200. The vehicle 200 can operate using different operational modes, with the different modes associated with different objectives. The modes can be different in that the propulsion system 206 and/or brake system 232 of the vehicle 200 operate in different ways to achieve (or work toward achievement of) the objectives associated with the respective modes. For example, in a first operating or operational mode, the controller 208 of the vehicle 200 may be configured to control operations of the vehicle 200 toward achievement of at least a first objective. The controller 208 in a second operating mode, on the other hand, is configured to designate different operational settings to drive the vehicle 200 toward achievement of at least a different, second objective. The controller 208 can switch between the first and second operating mode when an operating condition of the vehicle 200 changes (e.g., crosses a designated threshold). The operational settings may be one or more of speeds, throttle settings, brake settings, or accelerations for the vehicle 200 to implement during movement.

In one embodiment, upon initiating movement of the vehicle 200 from a stationary position, the vehicle 200 may operate according to a transitional operating mode. In this mode, the controller 208 can control movement of the vehicle 200 to achieve a spatial objective. The spatial objective can include a goal of controlling the location of the vehicle 200 along the route 210 to within one or more designated tolerance limits. For example, the spatial objective can include maintaining a location of the vehicle 200 within a second designated tolerance range relative to a target stopping location, or the like. Alternatively, the controller 208 can control the vehicle 200 according to another objective while in the transitional operating mode. The controller 208 can more tightly control the location of the vehicle 200 while in the transitional operating mode by limiting the power that can be generated and/or supplied to motors that rotate the axles 204 and/or wheels 202 relative to operating in another mode. For example, the controller 208 can limit the propulsion system 206 to operate within a smaller range of speeds, voltages and/or currents supplied to the motors, or the like, during operation in the transitional operating mode relative to other modes (which may use larger ranges).

Figure 12:
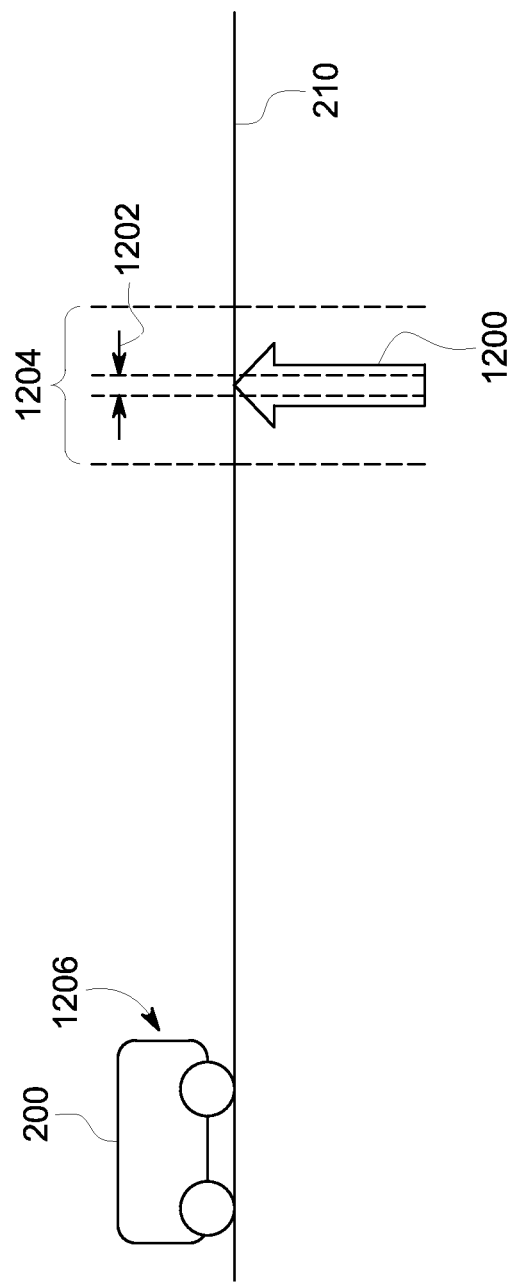
FIG. 12 illustrates the vehicle shown in FIG. 2 traveling along a route shown in FIG. 2 according to one example.

FIG. 12 illustrates the vehicle 200 traveling along the route 210 according to one example. The vehicle 200 may be operating in the transitional operating mode while moving along the route 210 toward a target stopping location 1200. The target stopping location 1200 can represent a location along the route 210 where the vehicle 200 is to stop, such as to load or unload cargo and/or passengers, to couple with one or more other vehicle units, to prevent collision with another object or vehicle, to park the vehicle 200, or the like. Using the transitional operating mode can provide for a vehicle 200 to be safely controlled to a stopping location without an operator controlling the vehicle 200 (regardless of whether the operator is in the vehicle 200 or not). When the controller 208 operates in the transitional operating mode, the controller 208 is able to slow down and stop the vehicle 200 such that a leading end 1206 of the vehicle 200 is within a smaller stopping range or tolerance 1202 around the stopping location 1200 when compared to the controller 208 operating in one or more, or all, other operating modes.

For example, when the controller 208 is operating in another mode (such as a moving mode, described herein), the controller 208 may use a wider range of operational settings of the propulsion system 206 such that the controller 208 only is able to stop the leading end 1206 of the vehicle 200 within a larger stopping range or tolerance 1204. While the leading end 1206 may occasionally be located within the smaller stopping range 1202, the majority or supermajority of stops of the vehicle 200 while operating in the moving mode result in the leading end 1206 being outside of the smaller range 1202 but within the larger range 1204.

In the transitional operating mode, the controller 208 optionally can control movement of the vehicle 200 to achieve a velocity objective. The velocity objective can include a goal of controlling the speed of the vehicle 200 along the route 210 to within one or more designated speed limits or ranges. The speed limits or ranges may be slower than a speed limit of the route 210. For example, the route 210 may be associated with a speed limit that indicates the maximum legally allowable speed that vehicles are permitted to travel on the route 210. The speed limit of the velocity objective can be smaller than the speed limit of the route 210. Optionally, the velocity objective can include a speed tolerance that limits how much faster or slower the vehicle 200 can travel above or below a speed selected by the operator of the vehicle 200 and/or a speed designated by a trip plan of the vehicle 200. For example, the speed tolerance may restrict the vehicle 200 to traveling within 2 kilometers per hour of an operator-selected speed or speed designated by a trip plan, while operating in another mode may allow the vehicle 200 to travel in excess of 2 kilometers per hour faster or slower than the selected or designated speed.

The movement of the vehicle 200 can be controlled to achieve another objective when the vehicle 200 is operating according to another operational mode. For example, while operating in the moving mode, the vehicle 200 can operate to achieve an efficiency objective. The efficiency objective can include controlling the propulsion system 206 (e.g., an engine) of the vehicle 200 to keep an operating parameter of the vehicle 200 below a designated limit while operating within one or more constraints (e.g., no slower than a designated, non-zero speed limit, reaching a destination or other location in no more than a designated time period, etc.). The operating parameter may be fuel consumption, emission generation, audible noise generation, or the like.

During travel according to the moving mode, the controller 208 can achieve the efficiency objective by limiting operations of the vehicle 200. For example, the controller 208 can prevent the throttle of the vehicle 200 from being controlled to accelerate or decelerate too quickly (e.g., faster or slower than a designated limit on acceleration or deceleration). As another example, the controller 208 can prevent the throttle of the vehicle 200 from being controlled to cause the vehicle 200 to accelerate or maintain a faster speed than needed (e.g., when approaching a downhill segment of the route 210). As another example, the controller 208 can prevent the brake system of the vehicle 200 from being activated to slow the vehicle 200 when the vehicle 200 is approaching an uphill segment of the route 210. In another example, the controller 208 can prevent the throttle of the vehicle 200 from changing settings or positions too rapidly. The controller 208 can limit how much these settings change or how far the throttle can be moved to smaller ranges of settings and/or smaller distances of movement during operation in the moving mode relative to operating in another mode.

In one embodiment, the controller 208 can control operations of the vehicle 200 in the moving mode to achieve the efficiency objective by traveling according to a trip plan. The trip plan can designate operational settings of the vehicle 200 as a function of time and/or distance along the route 210. These operational settings may include throttle settings, brake settings of a brake system 232 of the vehicle 200 (e.g., an air brake system, dynamic brakes, disc brakes, or the like), speeds of the vehicle 200, or the like. The operational settings of the trip plan may be used to instruct the operator on how to control the vehicle 200, such as by displaying or audibly presenting instructions on an output device 230 (shown in FIG. 2). The output device 230 can include a display device, speaker, or the like. Alternatively, the vehicle 200 may be directly controlled (e.g., autonomously) using the operational settings designated by the trip plan. For example, the controller 208, the propulsion system 206, the brake system 232, or the like, may be autonomously controlled according to the operational settings designated by the trip plan. The controller 208 may directly control the throttle of the propulsion system 206 and/or the brake system 232 without operator intervention during operation of the vehicle 200 in the moving mode only, in the transitional operating mode only, or in both the moving mode and the transitional operating mode.

The trip plan can be generated to achieve or increase specific goals or objectives during the trip of the vehicle 200, while meeting or abiding by designated constraints, restrictions, and limitations. Some possible objectives include increasing energy (e.g., fuel) efficiency, reducing emissions generation, reducing trip duration, increasing fine motor control, reducing wheel and route wear, and the like, relative to manual control of the vehicle 200 and/or control of the vehicle 200 according to something other than the trip plan. The constraints or limitations can include speed limits, schedules (such as arrival times at various designated locations), environmental regulations, standards, and the like. The operational settings of the trip plan are configured to increase the level of attainment of the specified objectives relative to the vehicle 200 traveling along the route 210 for the trip according to operational settings that differ from operational settings of the trip plan (e.g., such as if the human operator of the vehicle 200 determines the tractive effort and brake settings for the trip). One example of an efficiency objective of the trip plan is to increase fuel efficiency (e.g., by reducing fuel consumption) during the trip. By implementing the operational settings designated by the trip plan, the fuel consumed may be reduced relative to travel of the same vehicle system along the same segment of the route in the same time period but not according to the trip plan. The trip plan may be established using an algorithm based on models for vehicle behavior for the vehicle 200 along the route 210. The algorithm may include a series of non-linear differential equations derived from applicable physics equations with simplifying assumptions.

Different trip plans may have different objectives. Since a trip plan with an objective of fuel efficiency may not be relevant as a vehicle slows to a stop while approaching a designated stop location along the route, the trip plan may not be beneficial to an operator of the vehicle system while approaching and navigating the stop location at slow speeds. The trip plan may not be generated with an objective of fine motor control (e.g., which can be an objective of the transitional operating mode), so following instructions of the trip plan as the vehicle system approaches a stop location and exits the stop location may cause the vehicle system to stop and start abruptly, may cause the vehicle system to stop at an undesired or imprecise location relative to a desired stop location (e.g., stop within the range 1204 but not the range 1202 shown in FIG. 12), and/or may cause wheel and/or track wear due to wheel slippage, for example.

Returning to the description of the flowchart of the method 100 shown in FIG. 1, at 108, one or more characteristics are determined. The characteristic can be used to determine whether the vehicle 200 is to keep being controlled according to a current operational or operating mode, or if the operating mode of the vehicle 200 is to be switched. The characteristic that is determined can be a vehicle characteristic, a route characteristic, an environmental condition, a speed of the vehicle 200, a distance between the vehicle 200 and a stopping location 1200, and/or another characteristic.

The vehicle characteristic includes one or more of a mass (or weight) of the vehicle 200, a number of vehicle units included in the vehicle 200, a type of vehicle 200 (e.g., a make and/or model number of the vehicle 200), a type of propulsion system 206, an indication of whether one or more of the vehicle 200 or vehicle units of the vehicle 200 are loaded with cargo, or the like. This characteristic can be input to the controller 208 via the input device 228 from the operator, from an off-board facility, from a trip manifest, or from another source. With respect to the number of vehicle units, the vehicle 200 can represent a consist formed from two or more vehicle units traveling together along the route 210. The vehicle units can be connected with each other (e.g., rail vehicles traveling in a train) or disconnected with each other (e.g., a convoy of trucks, automobiles, or the like). This characteristic can be input to the controller 208 via the input device 228 from the operator, from an off-board facility, from a trip manifest, or from another source.

With respect to the indication of whether the vehicle 200 or vehicle units are loaded with cargo, this indication can represent whether the vehicle 200 or vehicle units are carrying cargo or passengers, or if the vehicle 200 or vehicle units are empty of cargo or passengers. This characteristic can be input to the controller 208 via the input device 228 from the operator, from an off-board facility, from a trip manifest, or from another source.

The route characteristic can include an occupancy condition of the route 210, a grade of the route 210, etc. The occupancy condition can represent the presence or absence of one or more other vehicles on the same route 210 or segment of the route 210 currently being traveled upon by the vehicle 200, the number of vehicles on the same route 210 or route segment as the vehicle 200, the distance between the other vehicles and the vehicle 200 along the route 210, or the like. The route characteristic can be determined based on schedules of the vehicle 200 and the other vehicles, information received by the controller 208 from a scheduling or dispatch facility, from the operator of the vehicle 200, or the like.

The environmental condition can represent a type of weather in which the vehicle 200 is traveling. For example, different environmental conditions can represent whether the vehicle 200 is traveling in snow, ice, rain, wind, or clear weather. This characteristic can be input to the controller 208 via the input device 228 from the operator, from an off-board facility, from a trip manifest, or from another source.

At 110, a determination is made as to whether the operating mode of the vehicle 200 is to be changed. The operating mode may be changed based on one or more of the characteristics determined at 108. For example, if the vehicle 200 is farther than a designated distance from the target stopping location 1200 (e.g., the vehicle 200 is far from this location, such as farther than a safe braking distance of the vehicle 200), then the operating mode of the vehicle 200 may be switched from the transitional operating mode to the moving mode. The mode may be changed in this manner so that the vehicle 200 can operate more efficiently until the vehicle 200 comes closer to the target stopping location 1200. As a result, flow of the method 100 can advance toward 112. On the other hand, if the vehicle 200 is no farther than the designated distance from the target stopping location 1200, then the operating mode of the vehicle 200 may not be switched from the transitional operating mode to the moving mode. The mode may be not be changed in this manner so that the vehicle 200 can stop closer to the target stopping location 1200 than the vehicle 200 would if the vehicle 200 switched to the moving mode. As a result, flow of the method 100 can return toward 106.

As another example, if the vehicle 200 has a number of vehicle units that is less than a designated number of units (e.g., the vehicle 200 is a single vehicle unit or has less than one hundred or another number of units), then the operating mode of the vehicle 200 may be switched from the transitional operating mode to the moving mode. As a result, flow of the method 100 can advance toward 112. On the other hand, if the vehicle 200 has a greater number of units than the designated number (e.g., the vehicle 200 is a long train or convoy), then the operating mode of the vehicle 200 may not be switched from the transitional operating mode to the moving mode. As a result, flow of the method 100 can return toward 106.

As another example, if the vehicle 200 is a type of vehicle that is the same as one or more designated types of vehicles (e.g., the vehicle 200 is a hybrid car, an all-electric car, a hybrid locomotive or includes a hybrid locomotive, etc.), then the operating mode of the vehicle 200 may be switched from the transitional operating mode to the moving mode. As a result, flow of the method 100 can advance toward 112. On the other hand, if the vehicle 200 is not this type of vehicle, then the operating mode of the vehicle 200 may not be switched from the transitional operating mode to the moving mode. As a result, flow of the method 100 can return toward 106.

As another example, if the vehicle 200 has or is associated with an indication that the vehicle 200 is not carrying cargo, then the operating mode of the vehicle 200 may be switched from the transitional operating mode to the moving mode. As a result, flow of the method 100 can advance toward 112. On the other hand, if the vehicle 200 is carrying cargo, then the operating mode of the vehicle 200 may not be switched from the transitional operating mode to the moving mode. As a result, flow of the method 100 can return toward 106.

As another example, if the route characteristic indicates that the route 210 being traveled by the vehicle 200 is congested with other vehicles, then the controller 208 may not switch from the transitional operating mode to the moving mode in order to ensure that the vehicle 200 travels safely on the route 210. For example, if the number, density, or the like, of the other vehicles on the same route 210 and/or a route 210 scheduled to be traveled by the vehicle 200 is larger than a designated traffic threshold number, density, or the like, then the controller 208 may not switch modes of the vehicle 200 (e.g., to the moving mode). As a result, flow of the method 100 may proceed toward 106. On the other hand, if the route characteristic does not indicate that the route 210 is congested with other vehicles, then the controller 208 may switch modes to the moving mode. Flow of the method 100 can proceed toward 112.

As another example, if the route characteristic indicates that one or more other vehicles on the same route 210 being traveled by the vehicle 200 are no more than a threshold distance away, then the controller 208 may not switch from the transitional operating mode to the moving mode. The controller 208 may not switch modes in order to prevent the vehicle 200 from traveling too fast and posing a risk of colliding with one or more of the other vehicles. In one aspect, the threshold distance may represent or be based on the distance required for the brake system 232 of the vehicle 200 to stop the vehicle 200 following application of the brake. This distance can increase for faster speeds of the vehicle 200, reduced braking capabilities of the vehicle 200, routes 210 having downhill grades, or the like. The distance may decrease for slower speeds, increased braking capabilities, uphill grades, or the like. If the controller 208 does not switch modes, then flow of the method 100 can proceed toward 106.

But, if the route characteristic does not indicate that there are one or more other vehicles on the route 210 and within the threshold distance from the vehicle 200, then the controller 208 may switch from the transitional operating mode to the moving mode. As a result, flow of the method 100 can proceed toward 112.

As another example, if the route characteristic indicates that the route 210 being traveled by the vehicle 200 is a downhill grade, then the controller 208 may not switch from the transitional operating mode to the moving mode in order to ensure that the vehicle 200 travels safely on the route 210. As a result, flow of the method 100 may proceed toward 106. On the other hand, if the route characteristic indicates that the route 210 is an uphill or flat grade, then the controller 208 may switch modes to the moving mode. Flow of the method 100 can proceed toward 112.

As another example, if the environmental condition indicates that the weather is a type of weather that can reduce visibility, braking capabilities of the vehicle 200, adhesion between the wheels 202 and the route 210, or the like, then the controller 208 may determine that the operating mode of the vehicle 200 should not be switched from the transitional operating mode to the moving mode at 110. For example, if the vehicle 200 is traveling through rain, ice, snow, fog, or the like, then the controller 208 may keep the vehicle 200 in the transitional operating mode to prevent the vehicle 200 from traveling at unsafe speeds and/or losing fine control over where the vehicle 200 is located on the route 210. As a result, flow of the method 100 can return toward 106. On the other hand, if the environmental condition does not indicate that the weather is of a type that can reduce visibility, braking capabilities, adhesion, or the like, then the controller 208 may switch from the transitional operating mode to the moving mode. As a result, flow of the method 100 can advance toward 112.

The determination that is made at 110 can focus on more than one of the characteristics described herein. Instead of determining whether to switch operating modes based on a single characteristic, the method 100 may determine whether to switch modes based on two or more characteristics. For example, if at least a designated number, percentage, fraction, or the like, of a set of two or more characteristics indicate that the mode of the vehicle 200 should be switched, then flow of the method 100 can proceed from 110 toward 112. On the other hand, if less than the designated number, percentage, fraction, or the like, of the characteristics do not indicate that the mode should be switched, then flow of the method 100 can proceed from 110 toward 106.

The preceding description of the determination made at 110 focuses on switching from the transitional operating mode to the moving mode. This determination also may be made when the vehicle 200 is operating in the moving mode. The method 100 can determine, at 110, if the vehicle 200 should switch from the moving mode to the transitional operating mode. For example, if the vehicle 200 is operating in the moving mode and is no farther than the designated distance from the target stopping location 1200, then the operating mode of the vehicle 200 may be switched from the moving mode to the transitional operating mode. On the other hand, if the vehicle 200 is farther than the designated distance from the target stopping location 1200, then the operating mode of the vehicle 200 may not be switched from the moving mode to the transitional operating mode.

As another example, if the route characteristic indicates that the route 210 being traveled by the vehicle 200 is not congested with other vehicles, then the method 100 may not switch from the moving mode to the transitional operating mode. On the other hand, if the route characteristic does indicate that the route 210 is congested with other vehicles, then the method 100 may switch modes to the transitional operating mode. As another example, if the route characteristic indicates that one or more other vehicles on the same route 210 being traveled by the vehicle 200 are at least the threshold distance away from the vehicle 200, then the method 100 may not switch from the moving mode to the transitional operating mode. But, if the route characteristic does indicate that there are one or more other vehicles on the route 210 and within the threshold distance from the vehicle 200, then the controller 208 may switch from the moving mode to the transitional operating mode. As another example, if the environmental condition indicates that the weather is not a type of weather that can reduce visibility, braking capabilities of the vehicle 200, adhesion between the wheels 202 and the route 210, or the like, then the method 100 may not switch from the moving mode to the transitional operating mode at 110. On the other hand, if the environmental condition does indicate that the weather is of a type that can reduce visibility, braking capabilities, adhesion, or the like, then the method 100 may switch from the moving mode to the transitional operating mode.

While the description of the method 100 focuses on switching between the transitional movement and moving modes, the method 100 optionally may be used to switch between one or more other operating modes.

At 112, the operating mode of the vehicle 200 is switched. The controller 208 may switch from the transitional operating mode to the moving mode, from the moving mode to the transitional operating mode, from the transitional operating mode or the moving mode to another mode, or between two other operating modes. The vehicle 200 may then operate within the constraints imposed by the current operating mode. In one embodiment, flow of the method 100 can return to 106 so that characteristics can continue to be monitored and so that one or more additional determinations of whether to switch modes can be made.

For example, in operating a rail vehicle carrying cargo, the method 100 may operate by detecting when the rail vehicle initiates movement. The method 100 may then operate the rail vehicle according to the transitional operating mode until one or more of the characteristics indicate that the operating mode of the rail vehicle can switch to the moving mode. The method 100 can continue monitoring one or more of the characteristics and, if the characteristics indicate that the mode should be switched, the method 100 can switch from the moving mode to one or more other operating modes, such as the transitional operating mode. For example, responsive to the rail vehicle coming within a threshold distance of another vehicle, a stopping location, or the like, the method 100 may switch the operating mode of the rail vehicle from the moving mode to the transitional operating mode. The rail vehicle may then operate according to the transitional operating mode until the rail vehicle comes to a stop.

Figure 13:
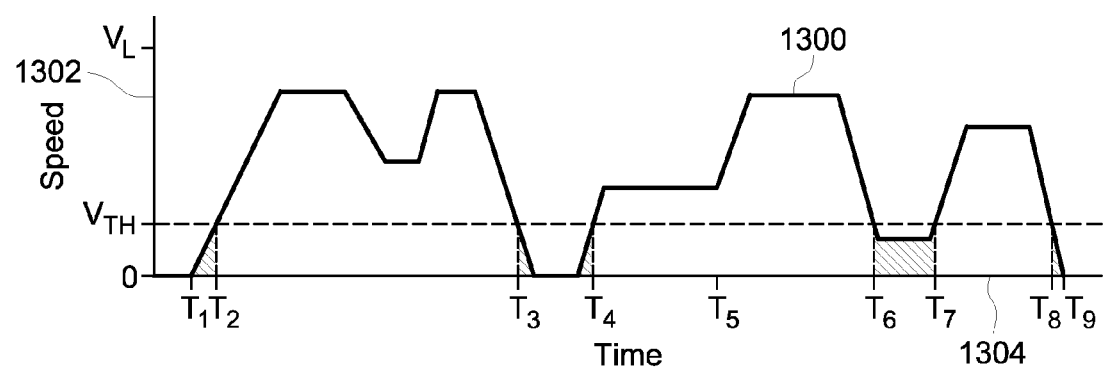
FIG. 13 illustrates a speed profile of the vehicle shown in FIG. 2 traveling on the route shown in FIG. 2 during a trip according to one embodiment.

FIG. 13 illustrates a speed profile 1300 of the vehicle 200 shown in FIG. 2 traveling on the route 210 shown in FIG. 2 during a trip according to one embodiment. The speed profile 1300 represents speeds of the vehicle 200 shown alongside a vertical axis 1302 representative of speeds and a horizontal axis 1304 representative of time or distance along the route 210. In one aspect, the speed profile 1300 may be dictated by a trip plan that designates the speeds of the vehicle 200 as a function of time and/or distance along the route 210 in order to achieve one or more objectives. Alternatively, the speed profile 1300 can represent the speeds at which the vehicle 200 traveled along the route 210, but not as designated by a trip plan (e.g., by following manual control, by traveling at speeds designated by speed limits, or the like).

As described above, the controller 208 may switch between a first and second operating mode when one or more characteristics of the vehicle 200 cross a designated threshold. In the illustrated embodiment, the operating condition that is used to determine the operating mode of the controller 208 is a speed of the vehicle 200 along the route 210. The designated threshold is a threshold speed $V_{TH}$. In an embodiment, the controller 208 may operate in a first operating mode (e.g., the moving mode) based on or responsive to the speed of the vehicle 200 being at least at the threshold speed $V_{TH}$, and the controller 208 may operate in the second operating mode (e.g., the transitional operating mode) based on or responsive to the speed of the vehicle 200 falling below the threshold speed $V_{TH}$.

During the trip, as shown in the speed profile 1300, the speed of the vehicle 200 may cross the threshold speed $V_{TH}$ multiple times. For example, the vehicle 200 travels faster than the threshold speed $V_{TH}$ during a majority of the trip. The controller 208 thus operates in the first operating mode for the majority of the duration of the trip. Yet, when the vehicle 200 starts on the trip, accelerates from a stopped position, and/or slows, the speed of the vehicle 200 is at least temporarily below the threshold speed $V_{TH}$. Thus, the controller 208 operates in the second operating mode at least at the times when the vehicle 200 is slowing to a stop or accelerating from a stop.

In an embodiment, the objectives for the movement of the vehicle 200 change responsive to a change in the operating mode of the controller 208. In the first operating mode (e.g., the transitional operating mode), when the vehicle 200 travels faster than the threshold speed $V_{TH}$, the controller 208 designates operational settings to drive the vehicle 200 to achieve a first objective. The first objective may be one or more of a reduction in fuel consumption by the vehicle 200, a reduction in emissions generation by the vehicle 200, a reduction in audible noise generated by the vehicle 200, improved handling of the vehicle 200 (e.g., reduced forces exerted on couplers in a vehicle 200 having two or more vehicle units), a reduction in travel time during the trip, or the like. The first objective may include multiple objectives, such as more than one of the objectives listed above. The reduction in fuel consumption, emissions generation, travel time, the improvement in handling, or the like, that is achieved by implementing the designated operational settings of the trip plan is relative to the vehicle 200 traveling along the route for the trip according to other, different operational settings, such as those that are manually selected by an operator of the vehicle 200, the operational settings that cause the vehicle 200 to travel at speed limits of the route 210, the operational settings that cause the vehicle 200 to arrive at a scheduled location earlier or later that a schedule dictates, or the like.

In one aspect, an energy management system 234 (shown in FIG. 2) can designate the operational settings of the trip plan. While the energy management system 234 is shown onboard the vehicle 200 in FIG. 2, the energy management system 234 alternatively may be disposed off-board the vehicle 200. The energy management system 234 can represent hardware circuitry that includes and/or is connected with one or more processors, microcontrollers, or other electronic logic-based devices. The energy management system 234 can designate the operational settings of a trip plan to drive the vehicle 200 toward achievement of the first objective while satisfying one or more constraints. For example, the constraints may include speed limits along the route 210, vehicle capability constraints, trip schedule times, emissions limits, and the like. Thus, as the vehicle 200 implements the designated operational settings, the vehicle 200 does not exceed the specified constraints for the relevant segment of the route 210. The speed limits may be permanent or temporary speed limits set by the railroad or highway authority. The temporary speed limits may be due to construction, maintenance, or congestion on the route 210. The vehicle capability constraints may include power output capabilities of the motors of the propulsion system 206 (shown in FIG. 2), notch settings of the input device 228 (shown in FIG. 2), and/or available fuel supply on the vehicle 200. The energy management system 234 may be configured to not designate operational settings that cause the propulsion system 206 to provide more power than the propulsion system 206 can supply. The trip schedule times include designated times for the trip, such as the projected arrival time at the destination location, scheduled meet-up times, and times that the vehicle 200 should reach designated route markers, such as wayside devices and/or stopping locations. The emissions limits may include limitations on fuel emissions, noise emissions, and the like, as designated by the Environmental Protection Agency (EPA), railroad companies, municipalities, and other regulatory authorities. Some of the constraints may be determined using information from the input device 228.

The first objective may be to reduce fuel consumption by the vehicle 200 along the length of the route 210 subject to the above constraints, such as emissions limits and speed limits. Optionally, the first objective may be to reduce emissions generated by the vehicle 200, subject to constraints such as fuel use and/or scheduled arrival time. In yet another example, the first objective may be to reduce the travel time without constraints on total emissions generated and/or fuel consumed where such relaxation of constraints would be permitted or required for the trip. The reduction in travel time may refer to a reduction in total travel time during the trip between the departure location and the destination location, and/or may refer to travel time along segments of the trip. Optionally, the first objective may include more than a single objective, such that the first objective includes both reducing fuel consumption and emissions generation of the vehicle 200 along the route 104 subject to constraints such as speed limits, vehicle capability constraints, and trip schedule times.

The handling of the vehicle 200 may involve controlling the forces exerted within the couplers between individual vehicle units of the vehicle 200. For example, prospective forces that are expected or calculated as being exerted on and/or experienced by couplers in the vehicle 200 may be reduced by limiting the allowable speeds of the vehicle 200. The allowable speeds may be limited to speeds that are slower than speed dictated by a trip plan of the vehicle 200, speed limits of the route, or the like. The handling of the vehicle 200 can be improved in that the coupler forces between vehicle units are reduced relative to vehicles that travel along the same routes without limiting the allowable speeds of the vehicles. The allowable speeds of the vehicle 200 may be restricted in those locations or segments of the route where the larger prospective forces on the couplers are expected to occur, while the allowable speeds of the vehicle 200 may not be restricted in other locations. As a result, the vehicle 200 may be able to travel at or near the designated speeds of a trip plan, the speed limits of the route, or the like, for most of a trip such that the vehicle 200 can remain on schedule or complete the trip in a time period closer to the time period contemplated by the trip plan and/or speed limits of the route. The vehicle handling may also include controlling the spacing between individual vehicles in the vehicle system. For example, the vehicle 200 may be controlled to manage the tension and compression in the couplers to maintain the forces within acceptable designated limits, which also affects the spacing between vehicles.

The energy management system 234 may generate a trip plan using an algorithm based on models for vehicle behavior for the vehicle 200 along the route 210. The algorithm may include a series of non-linear differential equations derived from applicable physics equations with simplifying assumptions. For example, for a first objective of reducing fuel consumption, the energy management system 234 may consult a plotted fuel-use over travel time curve that has been created using data from previous trips of different vehicles over the route 210 at different speeds. The generated trip plan designates operational settings for the vehicle 200 as a function of time and/or distance along the route 210. The operational settings can be designated to drive the vehicle 200 toward achievement of the first objective. Responsive to the vehicle 200 traveling at or above the threshold speed, the controller 208 is in the first operating mode. In the first operating mode, the energy management system 234 designates operational settings, according to a trip plan, in order to drive the vehicle 200 toward achievement of the first objective, which includes reducing fuel consumption, reducing emissions generation, improving vehicle handling, and/or reducing total travel time.

In an embodiment, the threshold speed is a speed that is selected prior to the trip of the vehicle 200. For example, the threshold speed may be a speed between five kilometers per hour (km/h) and thirty-two km/h, or, more specifically, between eight km/h and twenty-four mph. The threshold speed could be eight km/h, sixteen km/h, twenty-four km/h, or another value in various embodiments. The threshold speed may depend on the type of vehicle 200. For example, the threshold speed for a vehicle 200 that is a rail vehicle may be lower than a threshold speed for a vehicle 200 that is an automobile or an off-highway vehicle, and may be higher than a threshold speed for a vehicle 200 that is a water vessel.

Based on or responsive to the operating condition of the vehicle 200 falling below the designated threshold, the operating mode of the controller 208 and/or the objectives for the movement of the vehicle 200 can change. For example, when the speed of the vehicle 200 is below the threshold speed, the controller 208 can operate in the second operating mode. In the second operating mode, the energy management system 234 can designate operational settings to drive the vehicle 200 to achieve a second objective that differs from the first objective. In one embodiment, the operating mode of the energy management system 234 and the objective of the movement of the vehicle 200 change automatically upon the operating condition of the vehicle 200 crossing the threshold. For example, even if the speed of the vehicle 200 coincidentally or unintentionally falls below the designated speed threshold, the switch in operating mode of the controller 208 and/or the energy management system 234 and objective of the movement of the vehicle 200 is triggered. Alternatively, the switch in the operating mode and the movement objectives may occur based on the operating condition crossing the threshold, but not automatically. For example, upon detecting that the operating condition has crossed the designated threshold, the controller 208 may provide a notification to an on-board human operator via the output device 230, requesting or suggesting the change in operating conditions of the energy management system 234 and/or controller 208, and the change in movement objectives of the vehicle 200. Thus, the human operator may have the option and final authority on whether to proceed with the change or not.

The operating mode of the controller 208 and/or energy management system 234 can change based on the operating condition of the vehicle 200 because the relevancy or priority of objectives may change with changing circumstances or conditions of the vehicle 200 along the route 210. For example, when the vehicle 200 is traveling at speeds over the threshold speed, the relevant objectives may be reducing fuel consumption, reducing emissions generation, and/or reducing total travel time for the trip. These objectives are relevant at speeds over the threshold speed as the vehicle 200 may traverse a majority of the distance of the route 210 at such speeds. On the other hand, the vehicle 200 may move at speeds below the threshold speed when the vehicle 200 is slowing to a stop or accelerating from a stop, for example. At these conditions or circumstances, the fuel efficiency of the vehicle 200 may not be as high of a priority as other objectives, such as fine motor control or fine location control. Thus, fine motor control of the vehicle 200 may be more relevant than fuel efficiency at speeds of the vehicle 200 below the threshold speed. For this reason, the controller 208 can change operating modes from the first operating mode to the second operating mode when the speed of the vehicle 200 falls below the threshold speed so that different operational settings that drive the vehicle 200 toward achievement of a different, second objective that is more relevant to the vehicle 200 at that speed than the first objective are designated by the energy management system 234.

In an embodiment, the second objective relates to fine control over the vehicle 200, which is useful for controlling the vehicle 200 at slow speeds. Fine motor control may be beneficial as the vehicle 200 approaches, reaches, and departs designated stopping locations. For example, the second objective may include moving the vehicle 200 to one or more locations that are within a designated threshold distance of one or more designated locations of the trip.

The designated locations may include stopping locations (such as the destination location or a break location) designated in the trip schedule. For example, as the vehicle 200 approaches a station in order to change personnel and/or passengers, the station may have designated markers that indicate where the vehicle 200 is to come to a stop. The station may be relatively long, such that some vehicle systems are designated to stop at different locations than other vehicle systems in order to pick up or drop off the appropriate passengers and/or personnel. The markers may indicate where the propulsion vehicle 108 of the vehicle 200 is to stop. Since it is recognized that vehicle systems may not be able to stop exactly at a designated marker at a stopping location, the station and/or the transit authority may request that the vehicle 200 stop within a designated threshold distance, before or after, the marker. In an embodiment, the second objective may be to stop the vehicle 200 at a location that is within the designated threshold distance of the designated stopping location of the trip. To accomplish the second objective, the energy management system 234 may designate operational settings for the vehicle 200 to implement in order to practice fine motor control over the vehicle 200. For example, the operational settings may include slight adjustments to tractive efforts of the traction motors of the propulsion subsystem and slight adjustments to braking efforts of the braking subsystem to accomplish stopping the vehicle 200 within the designated threshold distance from a designated stopping location.

The operational settings designated by the energy management system 234 (e.g., according to a trip plan) may allow the vehicle 200 to stop within a closer proximity to the designated stopping location than if the vehicle 200 was being controlled solely by a human operator. In addition, the operational settings designated by the controller 208 to drive the vehicle 200 toward achievement of the second objective may allow the vehicle 200 to stop within a closer proximity to the designated stopping location than if the operational settings were designated to drive the vehicle 200 toward achievement of the first objective. For example, the fine motor control required in order to stop the vehicle 200 at such a close proximity to the designated stopping location may not have been attainable if the vehicle 200 is driven to achieve a different objective, such as fuel economy. The fine motor controls to drive the vehicle 200 toward achievement of the second objective may consume more fuel, generate more emissions, and/or take a longer amount of time to stop the vehicle 200 than if the vehicle 200 were being driven toward achievement of the first objective. As the vehicle 200 is approaching a stop, however, such as a station, the fuel consumption, emissions generation, and/or time of travel may not be as high of a priority as making sure that the vehicle 200 stops accurately within a threshold distance of a designated stopping location.

The controller 208 can monitor the progress of the vehicle 200 along the route 210 during a trip. For example, the controller 208 may compare the actual movements of the vehicle 200 to the projected movements of the vehicle 200 in a trip plan to determine whether to modify or update the trip plan. Optionally, the controller 208 may monitor the characteristics of the vehicle 200, the route 210, the environment, or the like, relative to one or more designated thresholds to determine when to switch between the first operating mode and the second operating mode (e.g., to determine whether the first objective or the second objective is appropriate). The controller 208 may monitor the characteristics to determine whether to switch modes if the vehicle 200 is traveling according to a trip plan or if the vehicle 200 is not traveling according to a trip plan.

The controller 208 may receive speed parameters associated with a current speed of the vehicle 200 from the speed sensor 212 (shown in FIG. 2). The controller 208 may compare the current speed of the vehicle 200 to the threshold speed to determine whether to operate in the first or second operating mode. The controller 208 also may monitor locations of the vehicle 200 based on data from the location determining device 218 (shown in FIG. 2) to determine a proximity of the vehicle 200 to designated locations (such as stopping locations).

Referring to the speed profile 1300, the vehicle 200 starts moving on the trip from the departure location at time T1. From time T1 to time T2, the speed of the vehicle 200 increases, but the speed is below the threshold speed VTH. Thus, the controller 208 operates in the second operating mode and/or the energy management system 234 designates operational settings (e.g., according to a trip plan) to drive the vehicle 200 toward achievement of the second objective. For example, as the vehicle 200 accelerates from time T1 to T2, the second objective may be to reduce wheel slip.

The speed of the vehicle 200 surpasses the threshold speed $V_{TH}$ at time T2 and travels faster than the threshold speed $V_{TH}$ until time T3. The speed sensor 212 can be used to determine when the vehicle 200 crosses the threshold speed $V_{TH}$. The controller 208 therefore operates in the first operating mode between times T2 and T3, such that the vehicle 200 is driven toward achievement of the first objective (e.g., reducing fuel consumption, emissions generation, and/or total travel time). Although the route 210 has a designated speed limit VL, the vehicle 200 may travel slower than the speed limit in order to improve fuel efficiency or reduce emissions as compared to the vehicle 200 traveling at the speed limit VL.

The vehicle 200 may slow to a stop at a designated stopping location roughly midway along the duration of the trip. As the vehicle 200 slows, the speed of the vehicle 200 falls below the threshold speed $V_{TH}$ at time T3. Thus, as the vehicle 200 slows to a stop after time T3, the controller 208 control or limit changes to the throttle and/or brakes of the vehicle 200 to drive the vehicle 200 to achieve the second objective (and/or the energy management system 234 can designate operational settings to drive the vehicle 200 toward the second objective). The second objective may be to stop the vehicle 200 within a threshold distance from a designated location, to stop the vehicle 200 such that the vehicles are bunched, to slow the vehicle 200 to reduce wheel slip, or the like.

Once the vehicle 200 starts moving along the trip again, the speed does not surpass the threshold speed $V_{TH}$ until T4. Optionally, from T4 to T5, the vehicle 200 may be subject to a slow order (e.g., a temporary reduced speed limit), which prevents the vehicle 200 from traveling faster than the temporary reduced speed limit. The vehicle 200 may subsequently slow again due to a different slow order. The second slow order may force the vehicle 200 to travel slower than the threshold speed $V_{TH}$ between times T6 and T7. Thus, the energy management system 234 may designate operational settings that control the vehicle 200 to achieve the second objective and/or the controller 208 may constrain operations of the vehicle 200 to achieve the second objective from time T6 to T7 even though the vehicle 200 does not come to a stop during this period of time. The vehicle 200 travels faster than the threshold speed $V_{TH}$ between times T7 and T8. The vehicle 200 arrives at the destination location at time T9. From time T8 to time T9, the controller 208 operates in the second operating mode to control movement of the vehicle 200 to achieve the second objective.

Optionally, the energy management system 234 may generate a single trip plan prior to the trip of the vehicle 200. The trip plan includes both operational settings toward achievement of the first objective and operational settings toward achievement of the second objective. Thus, when the controller 208 determines that the speed of the vehicle 200 crosses the designated threshold speed $V_{TH}$, the controller 208 implements the operational settings of the trip plan that corresponds to the objective associated with the speed. In an alternative embodiment, the energy management system 208 designates a single trip plan, but the trip plan only includes operational settings that drive the vehicle 200 toward achievement of the first objective or the second objective, but not both. Thus, as the vehicle 200 travels at a speed that corresponds to the objective of the trip plan, the controller 208 implements the operational settings of the trip plan. But, when the speed of the vehicle 200 crosses the threshold speed $V_{TH}$, the energy management system 234 may modify the trip plan to designate operational settings to drive the vehicle 200 toward achievement of the other objective. The energy management system 234 may generate the modified trip plan in real time during the trip (e.g., during movement of the vehicle 200).

In another embodiment, instead of a single trip plan, the energy management system 234 may designate plural different trip plans for the trip. The different trip plans may be associated with different operating modes. The different trip plans designate operational settings that drive the vehicle toward achievement of different objectives associated with the different, respective operating modes. For example, a first trip plan can include operational settings that drive the vehicle 200 toward achievement of the first objective and a different, second trip plan can include operational settings that drive the vehicle 200 toward achievement of the second objective. The controller 208 can monitor the speed of the vehicle 200 during the trip relative to the threshold speed $V_{TH}$ to determine whether to implement the operational settings of the first trip plan or the second trip plan.

In an alternative embodiment, the energy management system 234 does not generate the one or more trip plans for the trip. Instead, the trip plan(s) may be computed previously by the energy management system 234 for a previous trip of the vehicle 200 or by a different system. During the trip of the vehicle 200, the energy management system 234 and/or the controller 208 accesses the one or more trip plans (e.g., from the memory 226 shown in FIG. 2) and designates operational settings to drive the vehicle 200 according to the one or more trip plans. The energy management system 234 and/or controller 208 can select which trip plan and/or which operational settings to designate as the vehicle 200 travels based on the monitored speed of the vehicle 200 relative to the threshold speed $V_{TH}$. Thus, even if the energy management system 234 does not generate the trip plan specific to an upcoming trip, the energy management system 234 may still designate operational settings that have changing objectives based on the operating condition of the vehicle 200.

Figure 15:
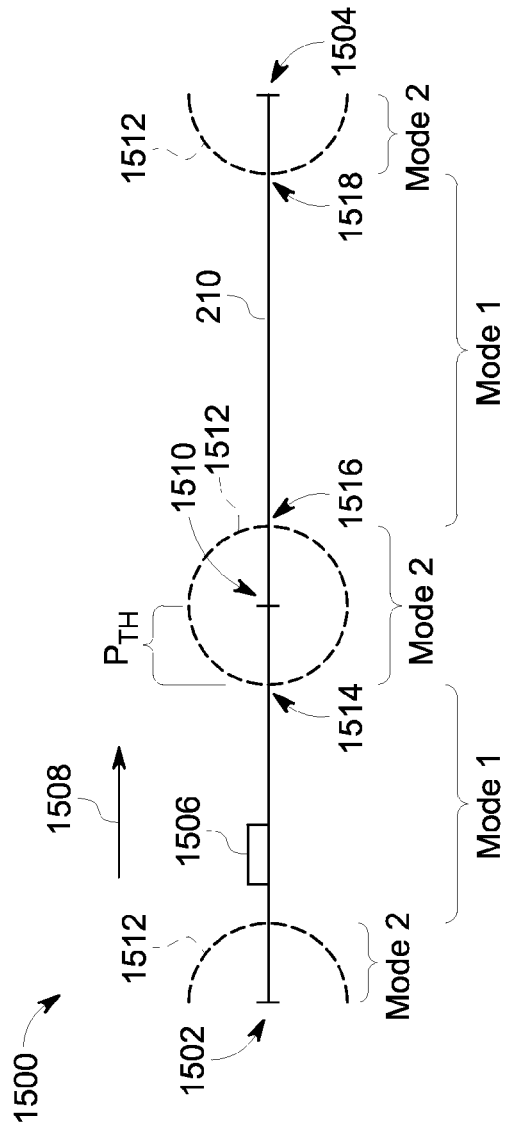
FIG. 15 is a schematic diagram showing a route profile of a vehicle traveling on a segment of the route shown in FIG. 2 during a trip according to one example.

FIG. 15 is a schematic diagram showing a route profile 1500 of a vehicle 1506, 1400 traveling on a segment of the route 210 during a trip according to one example. The vehicle 1506 can represent the vehicle 200 shown in FIG. 2. The segment of the route 210 extends from a starting location 1502 to an ending location 1504. The starting location 1502 may be a departure location for the trip and/or the ending location 1504 may be a destination location for the trip. The route profile 300 illustrates the distance between the starting location 1502 and the ending location 1504. The vehicle 1506 travels from the starting location 1502 towards the ending location 1504 in a direction of travel 1508. The trip also designates a break location 1510 where the vehicle 1506 is scheduled to stop for a period of time. The break location 1510 is located just less than half way across the segment of the route 210 on the illustrated route profile 1500.

In one embodiment, the operating condition that is used to determine the operating mode of the controller 208 of the vehicle 1506 is the location of the vehicle 1506. For example, the proximity or spatial separation of the vehicle 1506 to a designated location along the route 210 can be used to determine the operating mode of the vehicle 1506. The designated threshold is a threshold distance (shown in FIG. 3 as $P_{TH}$). The proximity of the vehicle 1506 to a designated location may be used as the operating condition instead of, or in addition to, the speed of the vehicle 1506, to determine which operating mode should be active. In an embodiment, the controller 208 may operate in the first operating mode (e.g., the moving mode) when the location of the vehicle 1506 is at least at or outside of the threshold proximity from a designated location along the route 210. Conversely, the controller 208 can operate in the second operating mode (e.g., the transitional operating mode) when the location of the vehicle 1506 is within the threshold distance of one of the designated locations. Thus, when the vehicle 1506 is within the threshold distance, the operational settings are constrained by the controller 208 to drive the vehicle 1506 toward achievement of the second objective, such as to provide fine motor control for accurate stopping, bunching of the vehicles, and/or reduced wheel slip.

On the other hand, when the vehicle 1506 is outside of the threshold distance, the controller 208 constrains the operational settings of the vehicle 1506 in a different manner or removes the constraints on the operational settings in order to drive the vehicle 1506 toward achievement of the first objective, such as to reduce fuel consumption, emissions generation, and/or total travel time. Although distance or proximity is being used as the operating condition in this embodiment instead of speed, optionally the first and second operating modes of the controller 208 (and the first and second objectives of the trip) may be the same as described above.

The threshold distance can include a distance that is selected prior to the trip. The threshold distance may be on the order of kilometers or miles. For example, the threshold proximity may be a distance between one and five kilometers, or, more specifically, between two to four kilometers (or other distances). In various embodiments, the threshold distance could be two, three, or four kilometers (or another distance). The threshold distance may be based on the type of vehicle 1506, route 210, or the like (e.g., based on vehicle characteristics, route characteristics, weather conditions, etc.). For example, the threshold distance may be longer if the grade of the route 210 is downhill (which would require more braking force) and/or if the vehicle 1506 has relatively poor braking abilities compared to other vehicles 1506 that travel on the route 210. Other considerations may include the size of the vehicle, including weight, and the speed that the vehicle travels outside of the threshold distance, which could affect the inertia of the vehicle system.

In operation, the controller 208 monitors the progress of the vehicle 1506 along the route 210 during the trip. The controller 208 may receive location data associated with a current location of the vehicle 1506 communicated from the location determining device 218. The controller 208 may compare the current location of the vehicle 1506 to the location of the designated locations to determine the operating mode of the controller 208. For example, the controller 208 may measure a distance of the vehicle 1506 from the designated location(s), and the controller 208 may compare the measured distance to the threshold distance to determine if the vehicle 1506 is within the threshold distance of a designated location. In another example, the controller 208 determines a threshold boundary line 1512 by adding and subtracting the threshold distance to the designated locations. The controller 208 can then determine when the vehicle 1506 crosses one of the threshold boundary lines to know whether the vehicle 1506 is within the threshold distance of a designated location.

In the illustrated example, the vehicle 1506 is currently located between the starting location 1502 and the break location 1510, and the vehicle 1506 is moving toward the break location 1510. The threshold boundary lines 1512 are shown in FIG. 15 as dashed lines around the designated locations 1502, 1504, 1510. The threshold boundary lines 1512 are circular curves that have a radius of the threshold distance $P_{TH}$. Alternatively, the threshold boundary lines 1512 may be locations on one or more sides of the designated locations. When the vehicle 1506 is within the boundary lines 1512 (e.g., between a boundary line 1512 and a designated location), the vehicle 1506 is less than the threshold distance from the designated location. In response, the controller 208 switches to operating in the first operating mode (e.g., the moving mode) to the second operating mode (e.g., the transitional operating mode).

In FIG. 15, the vehicle 1506 is not within any threshold boundary line 1512, so the controller 208 operates in the first operating mode. The energy management system 234 can designate operational settings and/or the controller 208 can use operational settings that drive the vehicle 1506 toward achievement of the first objective in the first operating mode. Thus, at the illustrated position, the operational settings may be driving the vehicle 1506 to increase fuel efficiency, reduce emissions, reduce total travel time, or the like.

When the vehicle 1506 crosses an entrance location 1514 to enter the threshold boundary line 1512 surrounding the break location 1510, the controller 208 switches to the second operating mode. In the second operating mode, the energy management system 234 designates operational settings and/or the controller 208 limits the allowable operational settings to drive the vehicle 1506 toward achievement of the second objective, such as to accurately stop the vehicle 1506 at the break location 1510, to provide bunching between the vehicle units of the vehicle 1506, to reduce wheel slip when slowing to a stop at the break location 1510, or the like.

The controller 208 can remain in the second operating mode through the initial acceleration of the vehicle 1506 from the break location 1510 until the vehicle 1506 crosses an exit location 1516 at the back end of the threshold boundary line 1512 surrounding the break location 1510.

Then, the controller 208 operates in the first operating mode until the vehicle 1506 crosses an entrance location 1518 to enter the threshold boundary line 1512 surrounding the ending location 1504 of the route 210. From the location 1504 to the ending location 1504, the controller 208 operates in the second operating mode.

When the vehicle 1506 is approaching a stop location or accelerating from a stop location, the controller 208 operates in the second operating mode to provide fine motor control of the vehicle 1506. But, when the vehicle 1506 is not near a stop location, the controller 208 operates in the first operating mode to provide fuel efficiency, reduced emissions, reduced travel time, or the like.

In the embodiments described in connection with FIGS. 13 and 15, the controller 208 is described as having two operating modes depending on whether the operating condition is over a threshold or below the threshold. In an alternative embodiment, the controller 208 may have more than two operating modes in order to designate or limit operational settings that have three different objectives depending on the operating condition of the vehicle 1506. For example, the controller 208 may compare actual operating conditions of the vehicle 1506 to plural different designated thresholds. The operating mode of the controller 208 is determined based on whether the operating condition is above and/or below thresholds associated with different operating modes.

Figure 14:
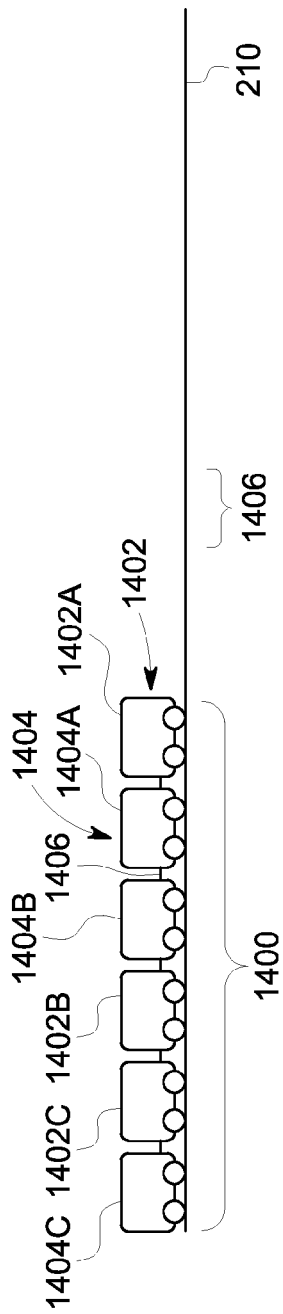
FIG. 14 illustrates a vehicle according to another embodiment.

FIG. 14 illustrates a vehicle 1400 according to another embodiment. The vehicle 1400 may represent the vehicle 200 shown in FIG. 2, with the vehicle 1400 including multiple vehicle units 1402 (e.g., units 1402A-C), 1404 (e.g., units 1404A-D) mechanically connected with each other by couplers 1406. The vehicle units 1402 can represent propulsion-generating vehicle units, such as locomotives, automobiles, off-highway vehicles (e.g., mining vehicles or other vehicles that are not permitted or designed for travel on public roadways), marine vessels, or the like. The vehicle units 1404 can represent non-propulsion-generating vehicles, such as rail cars, trailers, or the like. The number and arrangement of the units 1402, 1404 in the vehicle 1400 are provided merely as one example and are not limiting on all embodiments of the subject matter described herein.

Alternatively, two or more of the vehicle units 1402, 1404 may not be mechanically coupled with each other. For example, two or more of the vehicle units 1402, 1404, or all of the vehicle units 1402, 1404, may be separate from each other but may travel together as a group (or a convoy, platoon, etc.) along the route 210. The components shown onboard the vehicle 200 in FIG. 2 may be disposed onboard a single vehicle unit 1402 or may be split among the vehicle units 1402 and/or 1404.

In another example of different objectives associated with different operating modes of the vehicle 1400, the second objective (associated with the second operating mode or the transitional operating mode) can include stopping the vehicle 1400 such that multiple vehicle units 1402, 1404 of the vehicle 1400 are bunched together with one or more couplers 1406 between these vehicles 1402, 1404 being in a slack state once the vehicle 200 is stopped. The slack state can include the couplers 1406 having slack, such as that occurring when the couplers 1406 are not in tension.

The couplers 1406 are configured to absorb longitudinal forces between the vehicle units 1402, 1404 of the vehicle 200 (such as the vehicles 108, 110). As the vehicle 200 moves, longitudinal compression and tension forces shorten and lengthen the distance between the two vehicles. The couplers 1406 may be configured to allow for some free movement or slack of a first vehicle unit before the force is exerted on a second vehicle unit that is coupled to the first vehicle unit. When the coupler 1406 between two vehicle units is not under tension (or the tension in the coupler has a magnitude below a designated threshold), the coupler 1406 may be referred to as being in a slack state or slack condition. The slack state is in comparison to a stretch state of the coupler 1406 when the tension in the coupler 1406 has a magnitude greater than a designated threshold. It may be desirable in some situations for the couplers 1406 of a vehicle 1400 to be in the slack state when the vehicle 1400 is stopped because, when the vehicle 1406 starts moving again, the propulsion-generating vehicles 1402 may not need to pull the entire load of the vehicle 1400 from the stationary position at the same time. Instead, due to the accumulation of slack between the vehicle units (also referred to as bunching), the propulsion-generating vehicles may start by pulling and/or pushing a smaller number of the non-propulsion-generating vehicle units 1404 until the slack between the vehicle units 1402, 1404 is reduced, at which time the propulsion-generating vehicle unit 1402 pushes and/or pulls additional vehicle units. Due to bunching, the propulsion-generating vehicle units 1402 may be able to build up momentum over time without having to pull the entire load of the vehicle 1400 at once from a stopped position.

The second objective may be to stop the vehicle 1400 such that multiple vehicle units 1402, 1404 of the vehicle 1400 are bunched together when the vehicle 1400 is stopped. The energy management system 234 may designate operational settings (e.g., according to a trip plan) and/or the controller 208 may limit or constrain changes to throttle settings that provide for fine control over the tractive efforts and braking efforts of the vehicle 1400 as the vehicle 1400 slows to a stop in order for the couplers 1406 to attain the slack state. For example, the operational settings may control the braking system 232 to slow the vehicle units 1402, 1404 consecutively such that each vehicle unit 1402, 1404 comes to a stop soon or very close after the preceding vehicle unit 1402, 1404 in the vehicle 1400 (e.g., within one to three meters or another distance), which can provide slack in the corresponding coupler 1406. The controller 208 and/or energy management system 234 may designate the operational settings based on slack information received from string pots located between the vehicle units 1402, 1404. Stopping the vehicle 1400 in this way to achieve bunching may require more fuel consumption, emissions generation, and/or time than stopping the vehicle 1400 using operational settings designated to achieve the first objective. But, the operational settings designated to drive the vehicle 1400 to achieve the first objective would likely not be able to be used to achieve such bunching. Furthermore, due to benefit that bunching may provide the vehicle 1400 as the vehicle 1400 starts moving again, stopping the vehicle 1400 to achieve bunching may be more relevant or a higher priority than stopping the vehicle 1400 to achieve fuel efficiency or to save time, for example.

In another aspect, the second objective associated with the second operating mode (e.g., the transitional operating mode) can include moving the vehicle on the route 210 such that one or more wheels 202 of the vehicle retain adhesion with the route 210 to reduce wheel slip. Wheel slip can occur as the vehicle is braking or accelerating. A wheel 202 may "slip" on the route 210 when the rotational force in a forward direction (e.g., when accelerating) or in a reverse direction (e.g., when braking) exceeds the frictional force between the wheel 202 and the route 210, so the wheel 202 rotates relative to the route 210. Wheel slip results in skidding of the wheel 202 along the route 210, which causes wheel and route wear, and could cause more damage (e.g., such as a derailment) if not timely repaired. Wheel slip wears the wheels 202 and the route 210 to the extent that the wheels 202 and applicable segments of the route 210 may need to be replaced more often than would otherwise be required, so avoiding wheel slip is desirable from both an economic and a safety perspective.

As stated above, the second objective may be to move the vehicle on the route 210 such that one or more wheels 202 of the vehicle retain adhesion with the route 210 to reduce wheel slip. The controller 208 may limit operational settings and/or the energy management system 234 may designate operational settings (e.g., according to a trip plan) that provide for fine control over the tractive efforts and/or braking efforts of the vehicle as the vehicle brakes and/or accelerates at speeds below the threshold speed to reduce the risk of wheel slip. For example, the operational settings may control the brake system 232 to slow the vehicle gradually over a period of time in order to reduce the rotational force on each wheel 202. The period of time that the brakes are applied in accordance with the operational settings to achieve the second objective may be longer than the period of time that the brakes may be applied in accordance with operational settings designated to achieve the first objective (such as fuel efficiency or reduced travel time). The additional time and/or distance for braking allows for a reduction in the rotational force applied on the wheels 202, such that wheel slip is less likely than if the vehicle is being stopped according to the operational settings to achieve the first objective.

For example, if the first objective is to reduce travel time, the operational settings may control the vehicle to apply the brakes at a later time and/or location and at a greater setting to reduce the time spent slowing the vehicle. But, the greater brake application may cause wheel slip which may result in costly repairs to the vehicle and/or the route 210. Although the example above concerns the application of the brakes by the brake system 232, the operational settings may also control the propulsion subsystem to accelerate the vehicle gradually over a period of time in order to reduce the forward rotational force on each wheel 202. At speeds below the designated threshold speed, the potential costs of wheel slippage (e.g., replacing segments of the route 210 and/or wheels 202 and other equipment on the vehicle) may be more of a concern than the benefits of controlling the vehicle to improve fuel consumption, to reduce emissions, or to reduce travel time.

Optionally, the second objective may include more than one of the objectives listed above. For example, the operational settings may be designated to stop the vehicle within a designated threshold distance of a designated stopping location while controlling multiple vehicle units of the vehicle to be bunched together once the vehicle is stopped.

In one embodiment, the controller 208 can implement a stopping profile to stop movement of the vehicle responsive to the controller 208 switching to the mode used for stopping movement of the vehicle. For example, in response to switching from the moving mode to the transitional operating mode, the controller 208 can initiate a stopping profile. The stopping profile designates speeds, decelerations, rates of decreasing speeds or decelerations, etc., as a function of time and/or distance to slow down and stop the vehicle. The stopping profile can be used to slowly and controllably slow and stop movement of the vehicle, in contrast to the application of the brake system 232 to a full or large setting. For example, instead of applying emergency brakes (e.g., air brakes), depressing a brake pedal as far as reasonably possible, or the like, the controller 208 can implement the stopping profile to gradually reduce movement of the vehicle to a stop.

Figure 16:
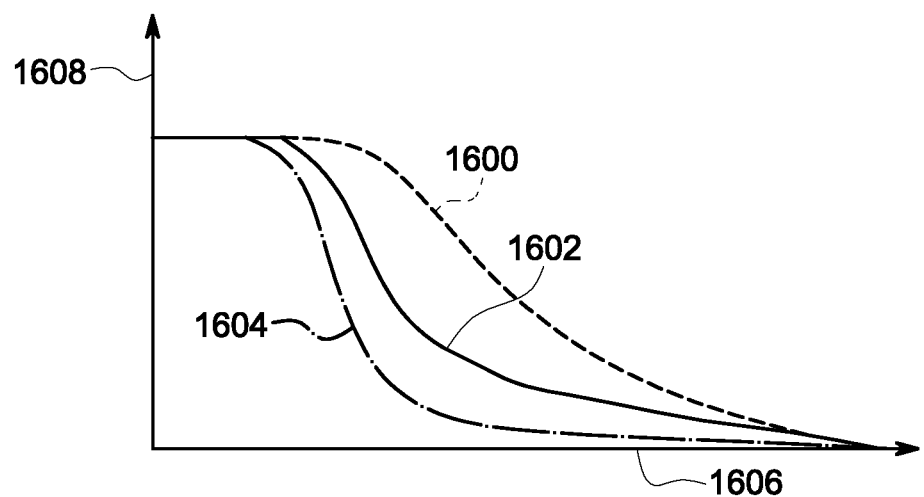
FIG. 16 illustrates different examples of stopping profiles according to one embodiment.

FIG. 16 illustrates different examples of stopping profiles 1600, 1602, 1604 according to one embodiment. The stopping profiles 1600, 1602, 1604 represent speeds of the vehicle, and are shown alongside a horizontal axis 1606 representative of time or distance and a vertical axis 1608 representative of speeds of the vehicle.

Implementing a selected stopping profile from the stopping profile 1600, 1602, 1604 can cause the controller 208 to directly control (e.g., automatically without operator intervention) the propulsion system and/or the brake system to cause the speed of the vehicle to decrease speed as designated by the selected stopping profile. As shown in FIG. 16, different stopping profiles 1600, 1602, 1604 include different rates of deceleration at different times.

The stopping profiles 1600, 1602, 1604 may be stored in the memory 226 of the movement detection system 236. The controller 208 can select a stopping profile for implementation based on one or more vehicle characteristics, route characteristics, environmental conditions, speeds of the vehicle at the change in modes, distances between the vehicle and a stopping location, and/or another characteristic.

With respect to vehicle characteristics, the controller 208 can select different stopping profiles based on different masses of the vehicle, different numbers of vehicle units included in the vehicle, different types of vehicles, different types of brake systems, different indications of whether the vehicles are loaded with cargo, or the like. For example, for heavier vehicles, larger vehicles (e.g., having more vehicle units than other vehicles), passenger trains (as opposed to freight trains), vehicles loaded with cargo, etc., a stopping profile that reduces speed more gradually (e.g., the stopping profile 1600) may be selected. Conversely, for lighter vehicles, smaller vehicles (e.g., having fewer vehicle units than other vehicles), freight trains (as opposed to passenger trains), vehicles that are not loaded with cargo, etc., a stopping profile that reduces speed more quickly (e.g., the stopping profile 1604) may be selected.

With respect to route characteristics, the controller 208 can select different stopping profiles based on different occupancy conditions of the route 210 and/or different grades of the route 210. For routes that are congested, the controller 208 may select a stopping profile having a more rapid decrease in speed (e.g., the profile 1604) instead of a stopping profile having a slower decrease in speed (e.g., the profiles 1600 or 1602). For routes that are not congested, the controller 208 may select a stopping profile having a slower decrease in speed instead of a stopping profile having a faster decrease in speed. For routes having uphill grades, the controller 208 may select a stopping profile having a slower decrease in speed than other stopping profiles due to additional slowing of the vehicle caused by gravity. For routes having downhill grades, the controller 208 may select a stopping profile having a faster decrease in speed than other stopping profiles due to additional acceleration of the vehicle caused by gravity.

With respect to environmental conditions, the controller 208 can select different stopping profiles based on different weather conditions. For example, for conditions that reduce adhesion between the wheels of the vehicle and the route and/or that reduce visibility, the controller 208 may select a more gradual stopping profile to avoid slipping by the wheels on the route. For conditions that do not reduce adhesion and/or visibility, a stopping profile with a faster decrease in speed may be selected.

The controller 208 can select a stopping profile based on the stopping location that the vehicle is traveling toward. For example, if the stopping location is a vehicle yard (e.g., a rail yard, parking lot, or the like), then the controller 208 can select a stopping profile that starts to slow movement of the vehicle at an earlier point in time or farther from the vehicle yard than one or more (or all) other stopping profiles. If the stopping location is a location where the vehicle needs to accurately stop at the location, such as a passenger loading dock, cargo loading location, or the like, then the controller 208 can select a stopping profile that allows the vehicle to stop closer to the location than one or more other stopping profiles. Upon initiation of movement from the stopping location (e.g., the vehicle changing from a stopped, zero velocity to a non-zero velocity), the controller 208 may accelerate differently based on the type of stopping location. For example, upon departure from the vehicle yard, the controller 208 may cause the propulsion system to accelerate as quickly as the vehicle can without the wheels 202 slipping on the route 210. Upon departure from a passenger or cargo loading station, however, the controller 208 may cause the propulsion system to accelerate more slowly to prevent damage to the cargo and ensure safe travel of the passengers.

Additionally or optionally, the stopping profiles may be associated with different types of brake systems. The brake system 232 shown in FIG. 2 can represent two or more brakes that slow or stop movement of the vehicle 200 using different components and/or techniques. For example, one type of brake included in the brake system 232 may be air brakes. Another type of brake included in the brake system 232 may be dynamic brakes. With respect to dynamic brakes, these brakes may be included in the propulsion system 206 as the motors that generate tractive effort to propel the vehicle 200. Other types of brakes may be included or used.

The different stopping profiles may designate the use of different types of brakes. One stopping profile may direct the controller 208 to apply air brakes, while another stopping profile directs the controller 208 to apply dynamic or regenerative brakes. In one aspect, a stopping profile can direct the controller 208 to apply different types of brakes at different times. For example, a stopping profile can direct the controller 208 to apply dynamic or regenerative brakes (with the regenerated energy being used to charge one or more batteries of the power source 224), a resistor grid, or motors of the propulsion system 206 to slow the vehicle until a designated speed, location, and/or time is reached, and then apply air brakes, a brake drum, or brake calipers of the vehicle to complete the stoppage of movement of the vehicle.

A stopping profile optionally may direct the controller 208 to change operation of the propulsion system 206. A stopping profile can direct the controller 208 to switch an engine of the propulsion system 206 to idle responsive to implementing the stopping profile. For example, upon activating or initiating a stopping profile, the controller 208 may place the engine in idle so that no more tractive effort is generated during performance of the stopping profile. Alternatively or additionally, the controller 208 may turn the engine off, shut down the engine according to an auto engine start stop (AESS) procedure, or the like.

Returning to the description of the multi-vehicle unit vehicle 1400 shown in FIG. 14, the controller 208 may use an operating mode of the vehicle 1400 or switch to an operating mode of the vehicle 1400 in order to index the vehicle 1400 between different positions along the route 210 in order to align different vehicle units 1402 and/or 1404 with a designated location 1406 along the route 210 at different times.

In one aspect, the designated location 1406 represents a cargo loading position along the route 210. The cargo loading position can include a passenger platform where passengers enter into the vehicle unit 1404 that is at the cargo loading position, a location where other cargo is placed into the vehicle unit 1404 at the cargo loading position, a parking space along a street where an operator or passenger may enter into the vehicle 1400, or the like. The vehicle 1400 can operate using the transitional operating mode to ensure that different vehicle units are accurately located at the cargo loading position at different times.

For example, during approach of the vehicle 1400 toward the designated location 1406 (as shown in FIG. 14), the controller 208 may switch to the transitional operating mode. The controller 208 may then control movement of the vehicle 1400 according to the transitional operating mode to index different vehicle units 1404 at the designated location 1406. This indexing can involve moving the vehicle 1400 until a first vehicle unit 1404A is stopped and located at the designated location 1406, waiting for cargo to be loaded onto and/or unloaded from the first vehicle unit 1404A, moving the vehicle 1400 in the transitional operating mode until a second vehicle unit 1404B is stopped and located at the designated location 1406, waiting for cargo to be loaded onto and/or unloaded from the second vehicle unit 1404B, and so on.

FIGS. 17 through 19 illustrate the vehicle 1400 being indexed through different locations according to one embodiment. As described above, the controller 208 can operate the vehicle 1400 in the transitional operating mode to accurately control the locations of the vehicles 1404 along the route 210. The controller 208 can move the vehicle 1400 until a first vehicle unit 1404A is stopped and located at the designated location 1406. Cargo can then be loaded onto and/or unloaded from the first vehicle unit 1404A (as shown in FIG. 17). The controller 208 may then move the vehicle 1400 in the transitional operating mode until a second vehicle unit 1404B is stopped and located at the designated location 1406, and then wait for cargo to be loaded onto and/or unloaded from the second vehicle unit 1404B (as shown in FIG. 18). The controller 208 may then move the vehicle 1400 in the transitional operating mode until a third vehicle unit 1404C is stopped and located at the designated location 1406, and then wait for cargo to be loaded onto and/or unloaded from the second vehicle unit 1404C (as shown in FIG. 19).

In one embodiment, a system (e.g., a movement detection system) includes a controller operable to switch between a transitional operating mode of a vehicle at a first vehicle speed and a moving mode of the vehicle at a second vehicle speed. The controller is configured to control movement of the vehicle to one or more of maintain a speed of the vehicle within a first designated tolerance range and/or maintain a location of the vehicle within a second designated tolerance range relative to a target stopping location during operation of the vehicle in the transitional operating mode. The controller also is configured to control the movement of the vehicle to control an engine of the vehicle to keep an operating parameter of the vehicle below a designated limit during operation of the vehicle in the moving mode. The controller is configured to switch the vehicle between the transitional operating mode and the moving mode based at least in part on one or more of the speed of the vehicle relative to a threshold speed value, a distance of the vehicle from the target stopping location, an environmental condition, a vehicle characteristic, and/or a route occupancy condition.

In one aspect, the operating parameter can include one or more of fuel consumed by the vehicle, emissions generated by the vehicle, and/or noise generated by the vehicle.

In one aspect, the environmental condition can include a type of weather condition in which the vehicle is moving.

In one aspect, the vehicle characteristic can include one or more of a mass of the vehicle, a number of vehicle units included in the vehicle, and/or an indication of whether one or more of the vehicle and/or the vehicle units are loaded with cargo.

In one aspect, the controller can be configured to autonomously control a throttle of the vehicle during operation of the vehicle in both the transitional operating mode and the moving mode.

In one aspect, the controller can be configured to, responsive to switching to the transitional operating mode, implement a stopping profile to stop the movement of the vehicle. The stopping profile can limit a rate at which the speed of the vehicle is reduced to stop the movement of the vehicle.

In one aspect, the controller can be configured to select the stopping profile that is implemented from plural different stopping profiles based at least in part on a type of the vehicle, a cargo being carried by the vehicle, a type of the target stopping location, and/or a mass of the vehicle.

In one aspect, the controller can be configured to implement the stopping profile by changing a type of brake system used to stop the movement of the vehicle at different times while slowing the movement of the vehicle according to the stopping profile.

In one aspect, the controller can be configured to idle the engine of the vehicle responsive to implementing the stopping profile.

In another embodiment, a method (e.g., for detecting movement of a vehicle and/or for changing operating modes of the vehicle) includes switching between a transitional operating mode of a vehicle at a first vehicle speed and a moving mode of the vehicle at a second vehicle speed, controlling movement of the vehicle to one or more of maintain a speed of the vehicle within a first designated tolerance range and/or maintain a location of the vehicle within a second designated tolerance range relative to a target stopping location during operation of the vehicle in the transitional operating mode, and controlling the movement of the vehicle to control an engine of the vehicle to keep an operating parameter of the vehicle below a designated limit during operation of the vehicle in the moving mode. Switching the vehicle between the transitional operating mode and the moving mode occurs based at least in part on one or more of the speed of the vehicle relative to a threshold speed value, a distance of the vehicle from the target stopping location, an environmental condition, a vehicle characteristic, and/or a route occupancy condition.

In one aspect, the operating parameter can include one or more of fuel consumed by the vehicle, emissions generated by the vehicle, and/or noise generated by the vehicle.

In one aspect, the environmental condition can include a type of weather condition in which the vehicle is moving.

In one aspect, the vehicle characteristic can include one or more of a mass of the vehicle, a number of vehicle units included in the vehicle, and/or an indication of whether one or more of the vehicle or the vehicle units are loaded with cargo.

In one aspect, the movement of the vehicle can be controlled during the transitional operating mode and during the moving mode by autonomously controlling a throttle of the vehicle.

In one aspect, the method also can include implementing a stopping profile to stop the movement of the vehicle responsive to switching from the moving mode to the transitional operating mode. The stopping profile can limit a rate at which the speed of the vehicle is reduced to stop the movement of the vehicle.

In one aspect, the method also can include selecting the stopping profile that is implemented from plural different stopping profiles based at least in part on a type of the vehicle, a cargo being carried by the vehicle, a type of the target stopping location, and/or a mass of the vehicle.

In one aspect, implementing the stopping profile can include changing a type of brake system used to stop the movement of the vehicle at different times while slowing the movement of the vehicle according to the stopping profile.

In one aspect, the method can include idling the engine of the vehicle responsive to implementing the stopping profile.

In another embodiment, a method (e.g., for detecting movement of a vehicle and/or for changing operating modes of the vehicle) includes implementing control of a vehicle, responsive to initiation of movement of the vehicle, according to a transitional operating mode of a vehicle. The vehicle is controlled to one or more of maintain a speed of the vehicle within a first designated tolerance range and/or maintain a location of the vehicle within a second designated tolerance range relative to a target stopping location during operation of the vehicle in the transitional operating mode. The method also includes switching the vehicle from the transitional operating mode to a moving mode responsive to the speed of the vehicle increasing above a designated threshold speed. The vehicle is controlled to control an engine of the vehicle to keep an operating parameter of the vehicle below a designated limit during operation of the vehicle in the moving mode. Switching the vehicle between the transitional operating mode and the moving mode occurs based at least in part on one or more of the speed of the vehicle relative to a threshold speed value, a distance of the vehicle from the target stopping location, an environmental condition, a vehicle characteristic, and/or a route occupancy condition.

In one aspect, the vehicle can include at least a propulsion-generating vehicle unit and plural non-propulsion-generating vehicle units configured to carry cargo. The method also can include implementing the control of the vehicle according to the transitional operating mode by indexing the vehicle between plural different positions that align the two or more non-propulsion-generating vehicle units with a cargo loading position at times different from each other.

In an embodiment, a system comprises a controller that is configured for operable coupling with one or more systems of a vehicle. The controller is operable to switch between a transitional operating mode of a vehicle at a first vehicle speed and a moving mode of the vehicle at a second vehicle speed. (For example, the second vehicle speed may be different from, and greater than, the first vehicle speed.) During operation of the vehicle in the transitional operating mode, the controller is configured to control movement of the vehicle to maintain a speed of the vehicle within a first designated tolerance range and/or maintain a location of the vehicle within a second designated tolerance range relative to a target stopping location. During operation of the vehicle in the moving mode, the controller is configured to control movement of the vehicle to control an engine of the vehicle to keep an operating parameter of the vehicle below a designated limit. The controller is configured to switch the vehicle between the transitional operating mode and the moving mode based at least in part on one or more of the speed of the vehicle relative to a threshold speed value, a distance of the vehicle from the target stopping location, an environmental condition, a vehicle characteristic, or a route occupancy condition.

In another embodiment, a method (e.g., implemented automatically or otherwise by a controller) comprises switching between a transitional operating mode of a vehicle at a first vehicle speed and a moving mode of the vehicle at a second vehicle speed. The method further comprises, in the transitional operating mode, controlling movement of the vehicle to maintain a speed of the vehicle within a first designated tolerance range and/or maintain a location of the vehicle within a second designated tolerance range relative to a target stopping location. The method further comprises, in the moving mode, controlling the movement of the vehicle (e.g., controlling an engine of the vehicle) to keep an operating parameter of the vehicle below a designated limit. Switching the vehicle between the transitional operating mode and the moving mode occurs based at least in part on one or more of the speed of the vehicle relative to a threshold speed value, a distance of the vehicle from the target stopping location, an environmental condition, a vehicle characteristic, or a route occupancy condition.

In another embodiment, a method (e.g., implemented automatically or otherwise by a controller) comprises implementing control of a vehicle, responsive to initiation of movement of the vehicle, according to a transitional operating mode of a vehicle, wherein in the transitional operating mode, the vehicle is controlled to maintain a speed of the vehicle within a first designated tolerance range and/or maintain a location of the vehicle within a second designated tolerance range relative to a target stopping location. The method further includes switching the vehicle from the transitional operating mode to a moving mode responsive to the speed of the vehicle increasing above a designated threshold speed, wherein the vehicle is controlled during operation of the vehicle in the moving mode (e.g., an engine of the vehicle is controlled) to keep an operating parameter of the vehicle below a designated limit. Switching the vehicle between the transitional operating mode and the moving mode occurs based at least in part on one or more of the speed of the vehicle relative to a threshold speed value, a distance of the vehicle from the target stopping location, an environmental condition, a vehicle characteristic, or a route occupancy condition.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A system comprising:
a controller including one or more processors, the controller operable to switch between a transitional operating mode of a vehicle and a moving mode of the vehicle,
wherein, during operation of the vehicle in the transitional operating mode, the controller is configured to control movement of the vehicle at a first efficiency level and is able to stop the vehicle within a first stopping range of a target stopping location,
wherein, during operation of the vehicle in the moving mode, the controller is configured to control the movement of the vehicle at a second efficiency level and is able to stop the vehicle within a second stopping range of the target stopping location, the second stopping range being larger than the first stopping range such that stopping the movement of the vehicle is less precise in the moving mode than in the transitional operating mode, the second efficiency level having one or more of a lower fuel consumption, a lower emissions generation, or a lower noise generation than the first efficiency level such that the movement of the vehicle is more efficient in the moving mode than in the transitional operating mode, and wherein the controller is configured to autonomously switch between the transitional operating mode and the moving mode without operator intervention based at least in part on one or more of a speed of the vehicle relative to a threshold speed value, a distance of the vehicle from the target stopping location, an environmental condition, or a route occupancy condition.

2. The system of claim 1, wherein the controller is configured to switch between the transitional operating mode and the moving mode based at least in part on the environment condition, the environmental condition including a type of weather condition in which the vehicle is moving.

3. The system of claim 1, wherein the controller is configured to switch between the transitional operating mode and the moving mode based in part on a vehicle characteristic that includes one or more of a mass of the vehicle, a number of vehicle units included in the vehicle, or an indication of whether one or more of the vehicle or the vehicle units are loaded with cargo.

4. The system of claim 1, wherein the controller is configured to autonomously control a throttle of the vehicle during operation of the vehicle in both the transitional operating mode and the moving mode.

5. The system of claim 1, wherein the controller is configured to, responsive to switching from the moving mode to the transitional operating mode as the vehicle moves along a route, implement a stopping profile to stop the movement of the vehicle, the stopping profile limiting a rate at which the speed of the vehicle is reduced to stop the movement of the vehicle.

6. The system of claim 5, wherein the controller is configured to select the stopping profile that is implemented from plural different stopping profiles based at least in part on a type of the vehicle, a cargo being carried by the vehicle, a type of the target stopping location, or a mass of the vehicle.

7. The system of claim 5, wherein the controller is configured to implement the stopping profile by applying different types of brake systems used to stop the movement of the vehicle at different times while slowing the movement of the vehicle according to the stopping profile.

8. The system of claim 5, wherein the controller is configured to idle an engine of the vehicle responsive to implementing the stopping profile such that the engine is in idle as the vehicle slows to a stop.

9. The system of claim 1, wherein the controller is configured to switch between the transitional operating mode and the moving mode based at least in part on the distance of the vehicle from the target stopping location, the controller configured to switch to the moving mode responsive to the distance exceeding a designated distance from the target stopping location, the controller configured to switch to the transitional operating mode responsive to the distance falling below the designated distance.

10. The system of claim 1, wherein the controller is configured to switch between the transitional operating mode and the moving mode based at least in part on the route occupancy condition, the controller configured to switch to the moving mode from the transitional operating mode responsive to the route occupancy condition indicating that there are no other vehicles on a same route as the vehicle within a threshold distance from the vehicle, the controller configured to switch to the transitional operating mode from the moving mode responsive to the route occupancy condition indicating that at least one other vehicle on the route is within the threshold distance from the vehicle.

11. The system of claim 1, further comprising a speed sensor disposed on the vehicle and configured to monitor the speed of the vehicle, the controller configured to receive speed parameters associated with the speed of the vehicle from the speed sensor, the controller further configured to compare the speed of the vehicle relative to the threshold speed value to determine whether to switch between the transitional operating mode and the moving mode.

12. The system of claim 1, wherein the controller is disposed on the vehicle.

13. A method comprising:
switching between a transitional operating mode of a vehicle and a moving mode of the vehicle;
controlling movement of the vehicle during operation of the vehicle in the transitional operating mode at a first efficiency level with an ability to stop the vehicle within a first stopping range of a target stopping location; and
controlling the movement of the vehicle during operation of the vehicle in the moving mode at a second efficiency level with an ability to stop the vehicle within a second stopping range of the target stopping location, the second stopping range being larger than the first stopping range such that stopping the movement of the vehicle is less precise in the moving mode than in the transitional operating mode, the second efficiency level having one or more of a lower fuel consumption, a lower emissions generation, or a lower noise generation than the first efficiency level such that the movement of the vehicle is more efficient in the moving mode than in the transitional operating mode;
wherein switching between the transitional operating mode and the moving mode occurs autonomously without operator intervention based at least in part on one or more of a speed of the vehicle relative to a threshold speed value, a distance of the vehicle from the target stopping location, an environmental condition, or a route occupancy condition.

14. The method of claim 13, wherein switching the vehicle between the transitional operating mode and the moving mode occurs based at least in part on the environmental condition, the environmental condition including a type of weather condition in which the vehicle is moving.

15. The method of claim 13, wherein switching the vehicle between the transitional operating mode and the moving mode occurs based in part on a vehicle characteristic that includes one or more of a mass of the vehicle, a number of vehicle units included in the vehicle, or an indication of whether one or more of the vehicle or the vehicle units are loaded with cargo.

16. The method of claim 13, wherein the movement of the vehicle is controlled during the transitional operating mode and during the moving mode by autonomously controlling a throttle of the vehicle.

17. The method of claim 13, further comprising, as the vehicle moves along a route, implementing a stopping profile to stop the movement of the vehicle responsive to switching from the moving mode to the transitional operating mode, wherein the stopping profile limits a rate at which the speed of the vehicle is reduced to stop the movement of the vehicle.

18. The method of claim 17, further comprising selecting the stopping profile that is implemented from plural different stopping profiles based at least in part on a type of the vehicle, a cargo being carried by the vehicle, a type of the target stopping location, or a mass of the vehicle.

19. The method of claim 17, wherein implementing the stopping profile includes applying different types of brake systems used to stop the movement of the vehicle at different times while slowing the movement of the vehicle according to the stopping profile.

20. The method of claim 17, further comprising idling an engine of the vehicle responsive to implementing the stopping profile such that the engine is in idle as the vehicle slows to a stop.

21. A method, comprising:
implementing control of a vehicle, responsive to initiation of movement of the vehicle, according to a transitional operating mode of a vehicle, wherein the vehicle is controlled in the transitional operating mode at a first efficiency level with an ability to stop the vehicle within a first stopping range of a target stopping location; and
switching the vehicle from the transitional operating mode to a moving mode responsive at least in part to a distance between the vehicle and the target stopping location exceeding a designated distance from the target stopping location, wherein the vehicle is controlled in the moving mode at a second efficiency level with an ability to stop the vehicle within a second stopping range of the target stopping location, the second stopping range being larger than the first stopping range such that stopping the movement of the vehicle is less precise in the moving mode than in the transitional operating mode, the second efficiency level having one or more of a lower fuel consumption, a lower emissions generation, or a lower noise generation than the first efficiency level such that the movement of the vehicle is more efficient in the moving mode than in the transitional operating mode.

22. The method of claim 21, wherein the vehicle includes at least a propulsion-generating vehicle unit and plural non-propulsion-generating vehicle units configured to carry cargo, and further comprising implementing the control of the vehicle according to the transitional operating mode by indexing the vehicle between plural different positions that align two or more of the non-propulsion-generating vehicle units with a cargo loading position at different times.

* * * * *